United States Patent
Weller et al.

(10) Patent No.: US 9,898,740 B2
(45) Date of Patent: Feb. 20, 2018

(54) ONLINE CHALLENGE-RESPONSE

(71) Applicant: Visa International Service Association, San Francisco, CA (US)

(72) Inventors: Kevin Weller, San Anselmo, CA (US); Kim Steele, Aldie, VA (US); Krishna Koganti, Cupertino, CA (US); Patrick Faith, Pleasanton, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 14/273,331

(22) Filed: May 8, 2014

(65) Prior Publication Data
US 2014/0244511 A1 Aug. 28, 2014

Related U.S. Application Data

(63) Continuation of application No. 13/964,992, filed on Aug. 12, 2013, now Pat. No. 8,762,279, which is a (Continued)

(51) Int. Cl.
*G06Q 40/00* (2012.01)
*G06Q 20/40* (2012.01)
(Continued)

(52) U.S. Cl.
CPC ......... *G06Q 20/4016* (2013.01); *G06F 21/31* (2013.01); *G06Q 20/12* (2013.01);
(Continued)

(58) Field of Classification Search
USPC ........................ 705/39, 40, 44, 35
See application file for complete search history.

(56) References Cited

U.S. PATENT DOCUMENTS 4,528,442 A 7/1985 Endo
5,177,342 A 1/1993 Adams
(Continued)

FOREIGN PATENT DOCUMENTS

EP 861461 B1 10/2008
EP 2 156 397 A1 2/2010
(Continued)

OTHER PUBLICATIONS

"Google Checkout XML API Developer's Guide"; 2008; 73 pages.
(Continued)

*Primary Examiner* — Ojo Oyebisi
(74) *Attorney, Agent, or Firm* — Kilpatrick Townsend & Stockton LLP

(57) ABSTRACT

Embodiments of the invention enable cardholders conducting an online transaction to be authenticated in real-time using a challenge-response application. The challenge-response application can be administered by an issuer or by a third party on-behalf-of an issuer. A challenge question can be presented to the cardholder, and the cardholder's response can be verified. The challenge question presented can be selected based on an analysis of the risk of the transaction and potentially other factors. A variety of dynamic challenge questions can be used without the need for the cardholder to enroll into the program. Additionally, there are many flexible implementation options of the challenge-response application that can be adjusted based on factors such as the location of the merchant or the location of the consumer.

21 Claims, 17 Drawing Sheets

Related U.S. Application Data continuation of application No. 12/613,395, filed on Nov. 5, 2009, now Pat. No. 8,533,118.

(60) Provisional application No. 61/112,124, filed on Nov. 6, 2008.

(51) Int. Cl.

| | | |
|---|---|---|
| *G06Q 20/12* | (2012.01) | |
| *G06F 21/31* | (2013.01) | |
| *G06Q 30/06* | (2012.01) | |
| *H04L 9/32* | (2006.01) | |
| *G06Q 50/26* | (2012.01) | |

(52) U.S. Cl.
 CPC ........... *G06Q 20/40* (2013.01); *G06Q 20/405* (2013.01); *G06Q 30/06* (2013.01); *G06Q 50/265* (2013.01); *H04L 9/3213* (2013.01); *H04L 9/3226* (2013.01); *H04L 9/3273* (2013.01); *G06F 2221/2103* (2013.01)

(56) References Cited

U.S. PATENT DOCUMENTS

| | | |
|---|---|---|
| 5,254,843 A | 10/1993 | Hynes |
| 5,311,594 A | 5/1994 | Penzias |
| 5,420,926 A | 5/1995 | Low |
| 5,434,398 A | 7/1995 | Goldberg |
| 5,465,387 A | 11/1995 | Mukherjee |
| 5,513,250 A | 4/1996 | McAllister |
| 5,530,438 A | 6/1996 | Bickham et al. |
| 5,539,810 A | 7/1996 | Kennedy, III |
| 5,613,012 A | 3/1997 | Hoffman |
| 5,615,110 A | 3/1997 | Wong |
| 5,625,689 A | 4/1997 | Indeck |
| 5,627,355 A | 5/1997 | Rahman |
| 5,708,422 A | 1/1998 | Blonder |
| 5,740,244 A | 4/1998 | Indeck |
| 5,774,525 A | 6/1998 | Kanevsky et al. |
| 5,781,438 A | 7/1998 | Lee |
| 5,812,668 A | 9/1998 | Weber |
| 5,819,226 A | 10/1998 | Gopinatham |
| 5,834,747 A | 11/1998 | Cooper |
| 5,872,834 A | 2/1999 | Teitelbaum |
| 5,878,337 A | 3/1999 | Joao |
| 5,883,810 A | 3/1999 | Franklin |
| 5,903,830 A | 5/1999 | Joao |
| 5,914,472 A | 6/1999 | Foladare |
| 5,920,628 A | 7/1999 | Indeck |
| 5,953,710 A | 9/1999 | Fleming |
| 5,956,699 A | 9/1999 | Wong |
| 5,988,497 A | 11/1999 | Wallace |
| 6,000,832 A | 12/1999 | Franklin |
| 6,012,144 A | 1/2000 | Pickett |
| 6,014,635 A | 1/2000 | Harris |
| 6,029,154 A | 2/2000 | Pettitt |
| 6,044,360 A | 3/2000 | Picciallo |
| 6,047,268 A | 4/2000 | Bartoli |
| 6,064,990 A | 5/2000 | Goldsmith |
| 6,095,413 A | 8/2000 | Tetro |
| 6,157,707 A | 12/2000 | Baulier |
| 6,163,771 A | 12/2000 | Walker |
| 6,219,793 B1 | 4/2001 | Li |
| 6,227,447 B1 | 5/2001 | Campisano |
| 6,236,981 B1 | 5/2001 | Hill |
| 6,263,447 B1 | 6/2001 | French et al. |
| 6,260,146 B1 | 7/2001 | Mos |
| 6,267,292 B1 | 7/2001 | Walker |
| 6,308,890 B1 | 10/2001 | Cooper |
| 6,327,578 B1 | 12/2001 | Linehan |
| 6,330,550 B1 | 12/2001 | Brisebois |
| 6,341,724 B2 | 1/2002 | Campisano |
| 6,422,462 B1 | 7/2002 | Cohen |
| 6,425,523 B1 | 7/2002 | Shem Ur |
| 6,442,532 B1 | 8/2002 | Kawan |
| 6,496,936 B1 | 12/2002 | French |
| 6,505,171 B1 | 1/2003 | Cohen |
| 6,529,725 B1 | 3/2003 | Joao et al. |
| 6,535,855 B1 | 3/2003 | Cahill et al. |
| 6,560,581 B1 | 5/2003 | Fox |
| 6,592,044 B1 | 7/2003 | Wong |
| 6,612,488 B2 | 9/2003 | Suzuki |
| 6,632,248 B1 | 10/2003 | Isaac |
| 6,636,833 B1 | 10/2003 | Flitcroft |
| 6,675,153 B1 | 1/2004 | Cook |
| 6,684,250 B2 | 1/2004 | Anderson et al. |
| 6,714,918 B2 | 3/2004 | Hillmer |
| 6,732,082 B1 | 5/2004 | Gavan |
| 6,748,367 B1 | 6/2004 | Lee |
| 6,805,287 B2 | 10/2004 | Bishop |
| 6,832,721 B2 | 12/2004 | Fujii |
| 6,836,670 B2 | 12/2004 | Castrogiovanni |
| 6,857,073 B2 | 2/2005 | French et al. |
| 6,879,965 B2 | 4/2005 | Fung |
| 6,899,269 B1 | 5/2005 | Deland |
| 6,901,387 B2 | 5/2005 | Wells |
| 6,913,194 B2 | 7/2005 | Suzuki |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,003,497 B2 | 2/2006 | Maes |
| 7,004,382 B2 | 2/2006 | Sandru |
| 7,024,396 B2 | 4/2006 | Woodward |
| 7,044,394 B2 | 5/2006 | Brown |
| 7,051,002 B2 | 5/2006 | Keresman, III |
| 7,051,929 B2 | 5/2006 | Li |
| 7,069,249 B2 | 6/2006 | Stolfo |
| 7,096,003 B2 | 8/2006 | Joao |
| 7,100,049 B2 | 8/2006 | Gasparini |
| 7,103,576 B2 | 9/2006 | Mann, III |
| 7,113,930 B2 | 9/2006 | Eccles |
| 7,136,835 B1 | 11/2006 | Flitcroft |
| 7,143,095 B2 | 11/2006 | Barrett |
| 7,165,051 B2 | 1/2007 | Ronning |
| 7,177,835 B1 | 2/2007 | Walker |
| 7,177,848 B2 | 2/2007 | Hogan |
| 7,194,437 B1 | 3/2007 | Britto |
| 7,225,156 B2 | 5/2007 | Fisher |
| 7,231,657 B2 | 6/2007 | Honarvar |
| 7,249,093 B1 | 7/2007 | King |
| 7,264,154 B2 | 9/2007 | Harris |
| 7,272,728 B2 | 9/2007 | Pierson |
| 7,273,168 B2 | 9/2007 | Linlor |
| 7,287,692 B1 | 10/2007 | Patel |
| 7,292,999 B2 | 11/2007 | Hobson |
| 7,319,978 B2 | 1/2008 | Minamishin |
| 7,330,871 B2 | 2/2008 | Barber |
| 7,343,149 B2 | 3/2008 | Benco |
| 7,343,351 B1 | 3/2008 | Bishop et al. |
| 7,350,230 B2 | 3/2008 | Forrest |
| 7,353,382 B2 | 4/2008 | Labrou |
| 7,357,310 B2 | 4/2008 | Calabrese et al. |
| 7,363,257 B2 | 4/2008 | Kunz |
| 7,373,669 B2 | 5/2008 | Eisen |
| 7,379,919 B2 | 5/2008 | Hogan |
| RE40,444 E | 7/2008 | Linehan |
| 7,415,443 B2 | 8/2008 | Hobson |
| 7,430,537 B2 * | 9/2008 | Templeton ......... G06Q 10/0635 705/26.35 |
| 7,444,676 B1 | 10/2008 | Asghari-Kamrani |
| 7,469,151 B2 | 12/2008 | Khan |
| 7,483,858 B2 | 1/2009 | Foran |
| 7,500,607 B2 | 3/2009 | Williams |
| 7,523,067 B1 | 4/2009 | Nakajima |
| 7,545,748 B1 | 4/2009 | Riddle |
| 7,548,889 B2 | 6/2009 | Bhambri |
| 7,548,890 B2 | 6/2009 | Shakkarwar |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |

(56) References Cited

U.S. PATENT DOCUMENTS

| | | |
|---|---|---|
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,606,770 B2 | 10/2009 | Pinnell |
| 7,620,600 B2 | 11/2009 | Patil |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,740,168 B2 | 6/2010 | Hammad |
| 7,752,084 B2 | 7/2010 | Pettitt |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,810,165 B2 | 10/2010 | Hammad |
| 7,819,322 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson et al. |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,224,702 B2 | 7/2012 | Mengerink |
| 8,225,385 B2 | 7/2012 | Chow |
| 8,265,993 B2 | 9/2012 | Chien |
| 8,280,777 B2 | 10/2012 | Mengerink |
| 8,328,095 B2 | 12/2012 | Oder, II |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,478 B2 | 8/2013 | Saunders |
| 8,510,816 B2 | 8/2013 | Quach |
| 8,533,118 B2 | 9/2013 | Weller et al. |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,688,543 B2 | 4/2014 | Dominguez |
| 8,706,621 B2 | 4/2014 | Carlson et al. |
| 8,744,958 B2 | 6/2014 | Carlson et al. |
| 2001/0029485 A1 | 10/2001 | Brody |
| 2001/0034720 A1 | 10/2001 | Armes |
| 2001/0054003 A1 | 12/2001 | Chien |
| 2001/0056409 A1 | 12/2001 | Bellovin et al. |
| 2002/0007320 A1 | 1/2002 | Hogan |
| 2002/0007352 A1 | 1/2002 | Fieschi |
| 2002/0016749 A1 | 2/2002 | Borecki |
| 2002/0029193 A1 | 3/2002 | Ranjan |
| 2002/0035548 A1 | 3/2002 | Hogan |
| 2002/0035622 A1 | 3/2002 | Barber |
| 2002/0062257 A1 | 5/2002 | Minamishin et al. |
| 2002/0073045 A1 | 6/2002 | Rubin |
| 2002/0077978 A1 | 6/2002 | O'Leary |
| 2002/0087344 A1 | 7/2002 | Billings et al. |
| 2002/0091562 A1 | 7/2002 | Siegel |
| 2002/0108062 A1 | 8/2002 | Nakajima |
| 2002/0111919 A1 | 8/2002 | Weller et al. |
| 2002/0116341 A1 | 8/2002 | Hogan |
| 2002/0120846 A1 | 8/2002 | Stewart |
| 2002/0133462 A1 | 9/2002 | Shteyn |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0050896 A1 | 3/2003 | Wiederin |
| 2003/0130955 A1 | 7/2003 | Hawthorne |
| 2003/0140004 A1 | 7/2003 | O'Leary |
| 2003/0154139 A1 | 8/2003 | Woo |
| 2003/0154406 A1 | 8/2003 | Honarvar |
| 2003/0191709 A1 | 10/2003 | Elston |
| 2003/0191945 A1 | 10/2003 | Keech |
| 2003/0208684 A1 | 11/2003 | Camacho |
| 2004/0010462 A1 | 1/2004 | Moon |
| 2004/0019564 A1 | 1/2004 | Goldthwaite |
| 2004/0050928 A1 | 3/2004 | Bishop |
| 2004/0059682 A1 | 3/2004 | Hasumi |
| 2004/0078340 A1 | 4/2004 | Evans |
| 2004/0093281 A1 | 5/2004 | Silverstein |
| 2004/0107170 A1 | 6/2004 | Labrou |
| 2004/0139008 A1 | 7/2004 | Mascavage |
| 2004/0143532 A1 | 7/2004 | Lee |
| 2004/0158532 A1 | 8/2004 | Breck |

(56) References Cited

U.S. PATENT DOCUMENTS

| | | |
|---|---|---|
| 2004/0171406 A1 | 9/2004 | Purk |
| 2004/0185830 A1 | 9/2004 | Joao |
| 2004/0210449 A1 | 10/2004 | Breck |
| 2004/0210498 A1 | 10/2004 | Freund |
| 2004/0210536 A1 | 10/2004 | Gudelj |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0097320 A1 | 5/2005 | Golan |
| 2005/0108178 A1 | 5/2005 | York |
| 2005/0119978 A1 | 6/2005 | Ates |
| 2005/0122209 A1 | 6/2005 | Black |
| 2005/0170814 A1 | 8/2005 | Joao |
| 2005/0199709 A1 | 9/2005 | Linlor |
| 2005/0240527 A1 | 10/2005 | Goldman |
| 2005/0246278 A1 | 11/2005 | Gerber et al. |
| 2005/0246293 A1 | 11/2005 | Ong |
| 2005/0269401 A1 | 12/2005 | Spitzer |
| 2005/0269402 A1 | 12/2005 | Spitzer |
| 2005/0273442 A1 | 12/2005 | Bennett |
| 2005/0278542 A1 | 12/2005 | Pierson et al. |
| 2006/0010072 A1 | 1/2006 | Eisen |
| 2006/0059110 A1 | 3/2006 | Madhok |
| 2006/0156385 A1 | 7/2006 | Chiviendacz |
| 2006/0202025 A1 | 9/2006 | Calabrese |
| 2006/0235795 A1 | 10/2006 | Johnson |
| 2006/0237528 A1 | 10/2006 | Bishop |
| 2006/0278704 A1 | 12/2006 | Saunders |
| 2006/0281439 A1 | 12/2006 | Benco |
| 2006/0282382 A1 | 12/2006 | Balasubramanian |
| 2007/0006286 A1 | 1/2007 | Singhal |
| 2007/0107044 A1 | 5/2007 | Yuen |
| 2007/0124801 A1 | 5/2007 | Thomas |
| 2007/0129955 A1 | 6/2007 | Dalmia |
| 2007/0136193 A1 | 6/2007 | Starr |
| 2007/0136211 A1 | 6/2007 | Brown |
| 2007/0143230 A1 | 6/2007 | Narainsamy |
| 2007/0170247 A1 | 7/2007 | Friedman |
| 2007/0174448 A1 | 7/2007 | Ahuja et al. |
| 2007/0179885 A1 | 8/2007 | Bird |
| 2007/0208671 A1 | 9/2007 | Brown |
| 2007/0214151 A1 | 9/2007 | Thomas et al. |
| 2007/0234409 A1 | 10/2007 | Eisen |
| 2007/0239606 A1 | 10/2007 | Eisen |
| 2007/0244830 A1 | 10/2007 | Hilderman |
| 2007/0245414 A1 | 10/2007 | Chan |
| 2007/0288377 A1 | 12/2007 | Shaked |
| 2007/0291995 A1 | 12/2007 | Rivera |
| 2008/0005037 A1 | 1/2008 | Hammad |
| 2008/0015988 A1 | 1/2008 | Brown |
| 2008/0029607 A1 | 2/2008 | Mullen |
| 2008/0034428 A1 | 2/2008 | Bejar |
| 2008/0035738 A1 | 2/2008 | Mullen |
| 2008/0039209 A1 * | 2/2008 | Chen .................. H04L 63/0823 463/42 |
| 2008/0040276 A1 | 2/2008 | Hammad |
| 2008/0046723 A1 | 2/2008 | Weber |
| 2008/0046968 A1 | 2/2008 | Cline |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065553 A1 | 3/2008 | Faith |
| 2008/0065554 A1 | 3/2008 | Hogan |
| 2008/0065555 A1 | 3/2008 | Mullen |
| 2008/0077526 A1 | 3/2008 | Arumugam |
| 2008/0087722 A1 | 4/2008 | Collins |
| 2008/0099552 A1 | 5/2008 | Grillion |
| 2008/0103972 A1 | 5/2008 | Lanc |
| 2008/0103982 A1 | 5/2008 | Hammad |
| 2008/0104684 A1 | 5/2008 | Lunde et al. |
| 2008/0120507 A1 | 5/2008 | Shakkarwar |
| 2008/0133420 A1 | 6/2008 | Barber |
| 2008/0154760 A1 | 6/2008 | Calabrese et al. |
| 2008/0162295 A1 | 7/2008 | Bedier |
| 2008/0183593 A1 | 7/2008 | Dierks |
| 2008/0189186 A1 | 8/2008 | Choi |
| 2008/0201264 A1 | 8/2008 | Brown |
| 2008/0201265 A1 | 8/2008 | Hewton |
| 2008/0208761 A1 | 8/2008 | Autry |
| 2008/0228646 A1 | 9/2008 | Myers |
| 2008/0243702 A1 | 10/2008 | Hart |
| 2008/0244744 A1 | 10/2008 | Thomas et al. |
| 2008/0245855 A1 | 10/2008 | Fein |
| 2008/0245861 A1 | 10/2008 | Fein |
| 2008/0255992 A1 | 10/2008 | Lin |
| 2008/0257959 A1 | 10/2008 | Oved |
| 2008/0283591 A1 | 11/2008 | Oder, II |
| 2008/0288384 A1 | 11/2008 | Collins et al. |
| 2008/0288405 A1 | 11/2008 | John |
| 2008/0298588 A1 | 12/2008 | Shakkarwar |
| 2008/0302869 A1 | 12/2008 | Mullen |
| 2008/0302876 A1 | 12/2008 | Mullen |
| 2008/0319869 A1 | 12/2008 | Carlson |
| 2008/0319896 A1 | 12/2008 | Carlson |
| 2008/0319904 A1 | 12/2008 | Carlson |
| 2009/0006262 A1 | 1/2009 | Brown |
| 2009/0010488 A1 | 1/2009 | Matsuoka |
| 2009/0037213 A1 | 2/2009 | Eisen |
| 2009/0037333 A1 | 2/2009 | Flitcroft |
| 2009/0043702 A1 | 2/2009 | Bennett |
| 2009/0048971 A1 | 2/2009 | Hathaway |
| 2009/0048975 A1 | 2/2009 | Felger |
| 2009/0049529 A1 | 2/2009 | Felger |
| 2009/0055315 A1 | 2/2009 | Felger |
| 2009/0083184 A1 | 2/2009 | Eisen |
| 2009/0099961 A1 | 4/2009 | Ogilvy |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0204524 A1 | 8/2009 | McGeorge |
| 2009/0248583 A1 | 10/2009 | Chhabra |
| 2009/0271306 A1 | 10/2009 | Pierson |
| 2009/0276347 A1 | 11/2009 | Kargman |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0036749 A1 | 2/2010 | Barber |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0029902 A1 | 2/2011 | Bailey |
| 2011/0040640 A1 | 2/2011 | Erikson |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |

(56) References Cited

U.S. PATENT DOCUMENTS

| | | |
|---|---|---|
| 2011/0154466 A1 | 6/2011 | Harper |
| 2011/0161233 A1 | 6/2011 | Tieken |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0116975 A1 | 5/2012 | Carlson |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0150744 A1 | 6/2012 | Carlson et al. |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0019098 A1 | 1/2013 | Gupta |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212666 A1 | 8/2013 | Mattsson |
| 2013/0218698 A1 | 8/2013 | Moon |
| 2013/0226813 A1 | 8/2013 | Voltz |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0052532 A1 | 2/2014 | Tsai |
| 2014/0052620 A1 | 2/2014 | Rogers |
| 2014/0052637 A1 | 2/2014 | Jooste |

FOREIGN PATENT DOCUMENTS

| | | |
|---|---|---|
| KR | 2001-0044769 A | 6/2001 |
| KR | 10-2002-0007303 A | 1/2002 |
| KR | 10-2004-0067372 A | 7/2004 |
| KR | 10-2006-0018792 A | 3/2006 |
| KR | 10-2006-0079290 A | 7/2006 |
| KR | 10-2007-0007044 A | 1/2007 |
| KR | 10-2008-0083077 A | 9/2008 |
| WO | 00-48108 A1 | 8/2000 |
| WO | 00-48360 A1 | 8/2000 |
| WO | 2001/035304 A1 | 5/2001 |

(56) References Cited

FOREIGN PATENT DOCUMENTS

| WO | 2001/035304 | A9 | 5/2001 |
|---|---|---|---|
| WO | 2004/042536 | A2 | 5/2004 |
| WO | 2004/091170 | A2 | 10/2004 |
| WO | 2005/001618 | A2 | 1/2005 |
| WO | 2005/001635 | A2 | 1/2005 |
| WO | 2005-111957 | A1 | 11/2005 |
| WO | 2006/113834 | A2 | 10/2006 |
| WO | 2008-102930 | A1 | 8/2008 |
| WO | 2008/115620 | A2 | 9/2008 |
| WO | 2009/002980 | A2 | 12/2008 |
| WO | 2009/003030 | A2 | 12/2008 |
| WO | 2009/032523 | A1 | 3/2009 |
| WO | 2010/078522 | A1 | 7/2010 |
| WO | 2012/068078 | A2 | 5/2012 |
| WO | 2012/098556 | A1 | 7/2012 |
| WO | 2012/142370 | A2 | 10/2012 |
| WO | 2012/167941 | A1 | 12/2012 |
| WO | 2013/048538 | A1 | 4/2013 |
| WO | 2013/056104 | A1 | 4/2013 |
| WO | 2013/119914 | A1 | 8/2013 |
| WO | 2013/179271 | A2 | 12/2013 |

OTHER PUBLICATIONS

"Google Checkout HTML API Developer's Guide"; 2008; 46 pages.
PayPal™; Developer Central: Custom Integration with Express Checkout; 2008; 3 pages.
PayPal™; "Website Payments Standard Integration Guide"; Jan. 2008; 194 pages.
PayPal™; Express Checkout Integration Guide; Feb. 2008; 70 pages.
PayPal™; Name-Value Pair API Developer Guide and Reference; Feb. 2008; 227 pages.
U.S. Appl. No. 12/143,509, filed Jun. 20, 2008.
International Search Report dated Dec. 31, 2008, for PCT Patent Application No. PCT/US2008/068003, 2 pages.
Written Opinion of the International Searching Authority dated Dec. 31, 2008, for PCT Patent Application No. PCT/US2008/068003, 5 pages.
International Search Report and Written Opinion dated Jan. 9, 2009 for PCT Application No. PCT/US2008/068040, 10 pages.
International Preliminary Report on Patentability dated Jan. 5, 2010 for PCT Application No. PCT/US2008/068040, 7 pages.
International Search Report of the International Searching Authority for Application No. PCT/US2009/063067, dated May 26, 2010, 10 pages.
Written Opinion of the International Searching Authority for Application No. PCT/US2009/063067, dated May 26, 2010, 4 pages.
Extended European Search Report dated May 10, 2011, for EP Patent Application No. 0877180.2, 10 pages.
Extended European Search Report dated May 11, 2011, for EP Patent Application No. 08771833.4, 4 pages.
European Communication dated Jan. 27, 2012, for EP Patent Application No. 08771833.4, 11 pages.
European Communication dated Apr. 25, 2012, for EP Patent Application No. 08771810.2, 10 pages.
Australian Office Action dated May 4, 2012, for AU Patent Application No. 2008268419, 3 pages.
Australian Office Action dated May 11, 2012, for AU Patent Application No. 2008268411, 3 pages.
Office Action dated Oct. 16, 2012 for European Patent Application No. 08771833.4, 9 pages.
Non-Final Office Action dated Oct. 18, 2012 for U.S. Appl. No. 13/355,270 13 pages.
Non-Final Office Action dated Dec. 12, 2012 for U.S. Appl. No. 13/358,475 13 pages.
Supplementary European Search Report dated May 10, 2011 for European Patent Application No. EP08771810.2, 10 pages.
Office Action dated Dec. 12, 2012 for Australian Patent Application No. 2008268411, 2 pages.
Office Action dated Mar. 12, 2013 for Australian Patent Application No. 2008268419, 4 pages.
Final Office Action dated Mar. 27, 2013 for U.S. Appl. No. 13/355,270, 8 pages.
Final Office Action dated Apr. 29, 2013 for U.S. Appl. No. 13/358,475, 6 pages.
Notice of Allowance dated Jul. 12, 2013 for U.S. Appl. No. 13/355,270, 8 pages.
Notice of Allowance dated Aug. 9, 2013 for U.S. Appl. No. 13/358,475, 9 pages.
Notice of Grant dated Sep. 19, 2013 for Australian Patent Application No. 2008268419, 2 pages.
Notice of Grant dated Oct. 3, 2013 for Australian Patent Application No. 2008268411, 2 pages.
Notice of Allowance dated Dec. 6, 2013 for U.S. Appl. No. 14/049,873, 11 pages.
Australian Office Action dated Jul. 14, 2014 for AU Patent Application No. 2009311303, 4 pages.
Non-final Office Action of U.S. Appl. No. 14/260,169 dated Nov. 3, 2014, 8 pages.
First Office Action and Examination Search Report, dated Dec. 2, 2014, in Canadian Application No. 2,692,276, 3 pages.
Office Action for Australian Patent Application 2009311303, dated Feb. 10, 2015, 4 pages.
Office Action for Canadian Patent Application 2,692,275, dated Jan. 27, 2015, 4 pages.
Final Office Action, dated Apr. 21, 2015, for U.S. Appl. No. 14/260,169, filed Apr. 23, 2014, 26 pages.
Non-Final Office Action, dated Oct. 23, 2015, for U.S. Appl. No. 13/358,472, filed Jan. 25, 2012, 12 pages.
Non-Final Office Action, dated Sep. 4, 2015, for U.S. Appl. No. 14/260,169, filed Apr. 23, 2014, 5 pages.

\* cited by examiner

*FIG. 14*

Which of the following transactions do you recognize?

| | | | |
|---|---|---|---|
| ☐ Jul. 03, 2008 | Rascals - Torrance | Torrance CA | $15.00 |
| ☐ Dec. 28, 2007 | Bed Bath & Beyond | Torrance CA | $21.83 |
| ☐ Jun. 18, 2008 | Quincy's Bbq | Encino CA | $40.00 |
| ☐ Dec. 25, 2007 | Walgreen | Huntington Beach CA | $15.23 |

☐ None of the above

[ Submit ]

ONLINE CHALLENGE-RESPONSE

CROSS-REFERENCES TO RELATED APPLICATIONS

This application is a continuation application of U.S. patent application Ser. No. 13/964,992, filed on Aug. 12, 2013, which is a continuation application of U.S. patent application Ser. No. 12/613,395, filed on Nov. 5, 2009, now U.S. Pat. No. 8,533,118 and issued Sep. 10, 2013, which is a non-provisional of and claims the benefit of U.S. Patent Application No. 61/112,124, entitled "Online Challenge-Response," filed on Nov. 6, 2008, which is herein incorporated by reference in its entirety for all purposes.

BACKGROUND

A large number of merchants maintain an online presence through the use of the Internet and the World Wide Web. In fact, some merchants maintain no physical stores at all. Instead, these merchants conduct all of their transactions over the Internet. Merchants engaging in electronic commerce are sometimes referred to as e-commerce merchants or online merchants. E-commerce merchants face many challenges compared to physical merchants.

Transactions conducted at a physical store may use payment instruments that also have a physical manifestation. For example, cash and personal checks are common physical payment instruments. Even when transaction accounts, such as credit or debit accounts, are used, the purchaser will typically be in possession of a physical token representing the account. A token, such as a credit card, can be examined by a merchant to confirm that the purchaser is in possession of the token and, to some extent, confirm the purchaser is authorized to use the token. For example, a merchant may examine the signature panel on the rear of a transaction card and compare it with a signature of the person using the transaction card. A match can be an indication that the user is authorized to use the card.

The use of physical payment instruments, such as cash and checks, in an e-commerce environment is typically not practical. As such, the use of transaction accounts in e-commerce is very common. Unfortunately, the use of transaction accounts has also lead to an increase in the potential for fraudulent use. The techniques used by a physical merchant to prevent fraud, such as verifying that the purchaser is in possession of the token and that signatures match, are typically not available in an e-commerce environment. An online merchant is typically able to obtain the transaction account number, the expiration date, and potentially additional token identifying information (e.g. cardholder verification value—the 3 digit number in the signature panel of most transaction cards) from the user during a checkout process on the e-commerce site. However, the merchant has no way of verifying that the user is actually in possession of the transaction card. Furthermore, even if the user is in possession of the transaction card, the merchant is not able to verify that the purchaser is authorized to use the transaction card.

Electronic commerce card associations and issuers have also instituted authentication systems to ensure that electronic commerce cards are only used by authorized cardholders. One example of an authentication system enables a cardholder to associate a password or other identifying information with an electronic commerce card. To make a purchase online, the consumer must provide the password, or other identifying information, associated with the electronic commerce card. This ensures that the person possessing the electronic commerce card is actually authorized to use the electronic commerce card.

While such authentication methods are effective, a number of improvements can be made. Better ways to authenticate consumers are desirable. Embodiments of the invention address the above problems, and other problems, individually and collectively.

BRIEF SUMMARY

Embodiments of the invention enable cardholders conducting an online transaction to be authenticated in real-time using a challenge-response application. Other embodiments of the invention enable cardholders conducting an online transaction to be authenticated in real-time using a challenge-response application that has been integrated with a password-based authentication system. Challenge-response applications provide the opportunity to reduce lost-stolen and counterfeit fraud, and provide a streamlined and enhanced referral process. The challenge-response application can be administered by an issuer or by a third party on behalf of an issuer. A challenge question can be presented to the cardholder, and the cardholder's response can be verified. The challenge question presented can be selected based on an analysis of the risk of the transaction (e.g., first time buyer, large ticket size, type of goods) and potentially other factors (e.g., first time buyer, non-US IP address, large ticket size, high risk merchant categories, geo-location of device, frequency, time of day, etc.). A variety of static, semi-dynamic, and dynamic challenge questions can be used without the need for the cardholder to enroll into the program. Additionally, there are many flexible implementation options of the challenge-response application that can be adjusted based on factors such as the location of the merchant or the location of the cardholder.

The challenges can be based on cardholder personal information (e.g., last four digits of your social security number, the month and day of your birthday) and on purchase transaction information (e.g., on which airlines did you purchase a ticket from in the past 60 days, in which states did you complete an in-store purchase in the past 30 days). Multiple challenges can also be presented, and the use of multiple challenges may allow for questions relating to both personal information and purchase transaction information.

Responses and cardholder device information can be used to authenticate the cardholder real-time, or can also be stored and sent to a forensic server for later offline analysis. Collected device information may include data such as the cardholder's IP address, browser version, browser language, date, time, and other device related information. The information can be used to help to determine the risk-level of the purchase, as well as to authenticate the cardholder. For example, a United States issued card being used from a location outside of the United States presents a higher risk than the same card being used from a location close to the cardholder's residence. Also, over time, it is possible to track and associate transaction history with specific devices to provide additional risk management capabilities. For example, if no fraud has occurred on a device over the past year, the device presents a lower risk than a device that has been fraudulently used in the recent past.

Challenges and response can also be used in conjunction with a password-based authentication system. Challenges and responses can be used in combination with passwords for various transactions. Challenges and responses can also be used for other related aspects of a password-based authentication system, such as password recovery.

One embodiment is directed to a method comprising: receiving an authentication request from a merchant's e-commerce site to authenticate a user engaging in a transaction on the e-commerce site; redirecting the user to a transaction routing system; determining at the transaction routing system, an issuer system, or both, if the user should be authenticated using a challenge response sequence, the determination based on a profile of the transaction or the user; issuing a challenge message to the user from the transaction routing system, the issuer system, or both, the challenge message being static, dynamic or semi-dynamic; receiving a response from the user; approving or denying the authentication based on the response; and sending an authentication status to the merchant's e-commerce site indicating if the user has been authenticated, wherein if the user is authenticated the merchant's e-commerce site proceeds to obtain authorization for the transaction.

Another embodiment is directed to transaction routing system comprising: a processor; and a memory coupled to the processor, the memory comprising computer code for receiving an authentication request from a merchant's e-commerce site to authenticate a user engaging in a transaction on the e-commerce site, computer code for redirecting the user to a transaction routing system, computer code for determining at the transaction routing system, an issuer system, or both, if the user should be authenticated using a challenge response sequence, the determination based on a profile of the transaction or the user, computer code for issuing a challenge message to the user from the transaction routing system, the issuer system, or both, the challenge message being static, dynamic or semi-dynamic, computer code for receiving a response from the user, computer code for approving or denying the authentication based on the response, and computer code for sending an authentication status to the merchant's e-commerce site indicating if the user has been authenticated, wherein if the user is authenticated the merchant's e-commerce site proceeds to obtain authorization for the transaction.

Yet another embodiment is directed to a method comprising: receiving an authentication request from a merchant's e-commerce site to authenticate a user engaging in a transaction on the e-commerce site; redirecting the user to a transaction routing system; determining at the transaction routing system, an issuer system, or both, if the user should be authenticated using a challenge response sequence, the determination based on a profile of the transaction or the user; issuing a challenge message to the user from the transaction routing system, the issuer system, or both, over a first communications network, the challenge message being static, dynamic or semi-dynamic; sending at least a portion of an expected challenge response to the user via a second communications network; receiving a challenge response from the user over the first communication network, the response containing at least a portion of the expected challenge response; approving or denying the authentication based on the challenge response message; and sending an authentication status to the merchant's e-commerce site indicating if the user has been authenticated, wherein if the user is authenticated the merchant's e-commerce site proceeds to obtain authorization for the transaction.

Other embodiments of the invention are directed to users using phones to engage in transactions processed according to the above systems and methods.

BRIEF DESCRIPTION OF THE DRAWINGS

FIGS. 14-17 show screenshots that can be used in embodiments of the invention.

DETAILED DESCRIPTION

Figure 1:
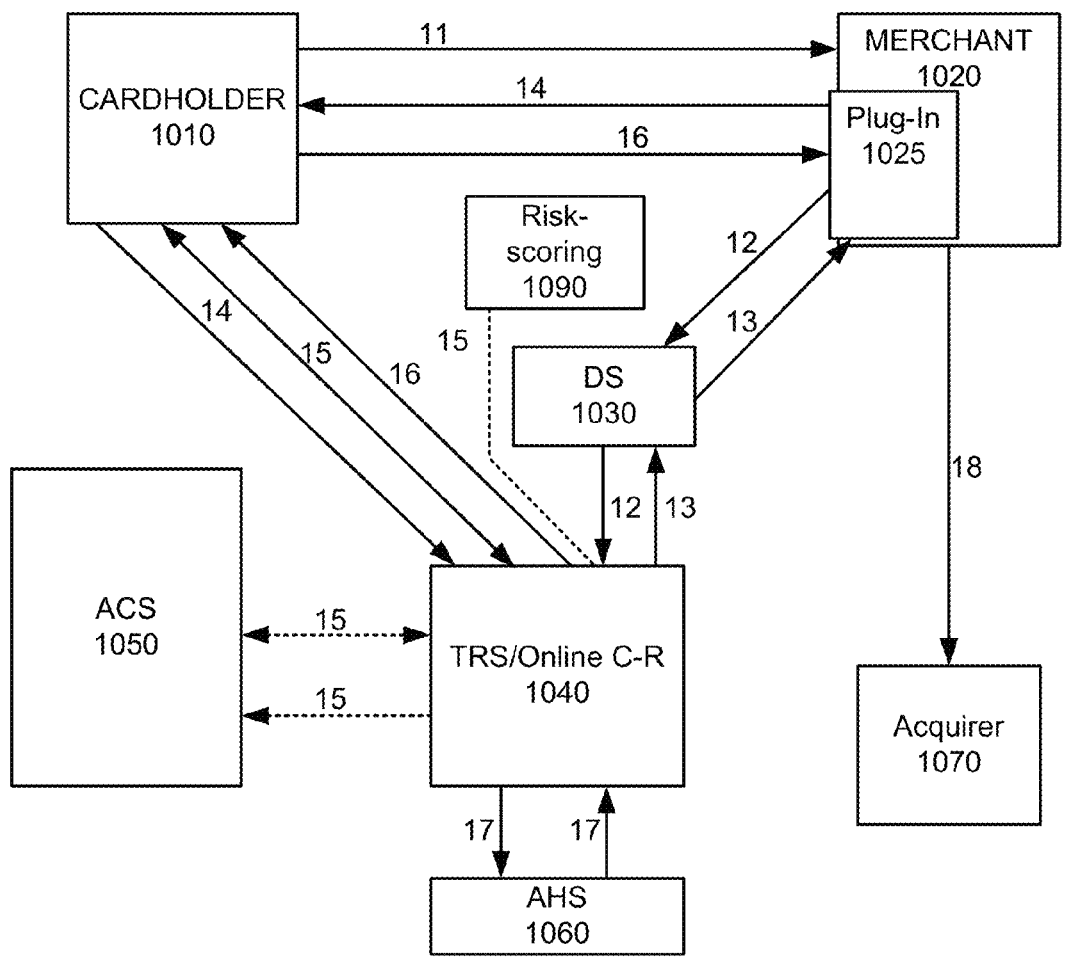
FIGS. 1-12 shows various block diagrams of embodiments of a system that can be used in some embodiments of the invention.

Challenge-Response is an authentication mechanism whereby a cardholder is asked a question whose answer would presumably only be known by the cardholder. In some cases, the question may require a static answer, such as "What are the last four digits of your social security number?" In other cases, the question may be based on a cardholder's transaction history, and thus may require a more dynamic answer. An example of such a question could be "Did you eat at an Italian restaurant yesterday?" Unlike a static password challenge, Challenge-Response questions can be created dynamically, and may vary depending on the particular characteristics of the current transaction.

Embodiments of this disclosure integrate Challenge-Response authentication into existing authentication systems that use password mechanisms to help authenticate transactions. A payment processing network or an issuer may initiate a Challenge-Response sequence in order to authenticate a cardholder performing a transaction. In some cases, this may be done in addition to password authentication previously enabled by the system. Challenge-Response sequences may be initiated by payment processing networks or issuers based on specified criteria and can be performed by either party.

The criteria used to determine when Challenge-Response authentication will be utilized can be very complex, including parameters such as transaction geographic location, merchant type, transaction amount, or any of a host of other parameters. Furthermore, external risk evaluation and assessment systems may be used as inputs to the decision making process. Additionally, characteristics of the device being used to perform a transaction can also be an input to the decision making process. In some cases the device itself can become part of the Challenge-Response mechanism.

A device that is not directly involved in the transaction may also become part of the Challenge-Response sequence. For example, a cardholder may initiate a purchase on a merchant's web site using his personal computer. Using an existing password system, the system may decide to issue a challenge to the cardholder instructing the cardholder to enter the contents of a text message that is being sent to the cardholder's mobile phone. The system can then send a text message to the cardholder containing the desired response. By responding to the challenge with the contents of the text message, the cardholder has further authenticated that he is in possession of a device that should only be in the possession of an authorized cardholder. By varying the contents of the text message for each transaction, a "One Time Password" is created, thus ensuring that if a single text message is intercepted, it is of no value for future authentications.

Before describing various embodiments of the invention in more detail, it may be useful to define some general terms that are frequently used to describe the embodiments.

As used herein, an "issuer" can refer to any suitable entity that may open and maintain an account associated with consumer. Some examples of issuers may be a bank, a business entity such as a retail store, or a governmental entity. In many cases, issuer may also issue an electronic commerce cards to consumer. The issuer typically has an established relationship with the consumer and therefore has data that can be used to authenticate the consumer. Such data may include the consumer's social security number, birthday, account number, shipping address, preferences, etc.

As used herein, an "acquirer" is typically a business entity, e.g., a commercial bank that has a business relationship with a particular merchant. Some entities can perform both issuer and acquirer functions. Embodiments of the invention encompass such single entity issuer-acquirers.

As used herein, a "cardholder" can refer to a consumer who has an account with an issuer that can be used to conduct transactions with merchants. A cardholder may have one or more portable consumer devices associated with the account, such as a credit card, debit card, mobile phone, etc., that can assist in the use of the account to conduct a transaction.

As used herein, a "server" is typically a powerful computer or cluster of computers. For example, a server may be a large mainframe, a minicomputer cluster, or a group of servers functioning as a unit. In one example, a server may be a database server coupled to a web server. Moreover, a server can behave as a single computer, which services the requests of one or more client computers or portable electronic devices.

As used herein, in some embodiments, a "merchant server" can refer to a server used to provide an online storefront for consumers to shop and also to conduct online transactions with consumers once the consumers have decided to purchase goods from the merchant.

As used herein, in some embodiments, a "merchant plug-in" or "MPI" can refer to a component that performs various authentication functions on behalf of the merchant. The merchant plug-in may be embodied by suitable hardware and/or software that are accessible to a merchant. For example, the MPI may be software running on the merchant server or it may be a component run on a different server accessible by the merchant. The MPI may be able to perform functions such as initiating the authentication request, determining whether authentication is available for a card number, validating a digital signature in an authentication message, interpreting the authentication results, and other functions.

As used herein, in some embodiments, an "access control server" (or "ACS") can refer to a server computer that provides issuers, or other entities capable of authenticating a consumer conducting an online transaction, with the ability to authenticate consumers during an online transaction. As used herein, an "issuer ACS" refers to an ACS managed by an issuer. Often, ACS and issuer ACS are used interchangeably in this disclosure. An ACS performs the requested authentication services and provides digitally signed responses to entities requesting authentication. An ACS may be shared by multiple parties. Alternatively, a party may have multiple access control servers, each associated with a different subset of the consumers.

As used herein, in some embodiments, an "AHS" can refer to an authentication history server. An AHS is a server which can receive and archive the result of authentication attempts in an authentication system. An AHS may record both successful and unsuccessful authentication attempts. An AHS may receive data relating to authentications from issuers, payment processing networks, or any other entity involved in the authentication process. The data stored by the AHS can later be analyzed for various purposes.

As used herein, in some embodiments, a "directory server" or "DS" can refer to a server computer that can be used to route messages containing enrolment and authentication information between a merchant plug-in (MPI) and an ACS. The directory server can also determine whether a consumer can utilize the authentication services and can apply business rules to modify the response to the MPI. In some embodiments, the directory server can be operated by a service organization such as Visa.

As used herein, in some embodiments, a "TRS/Online C-R" can refer to a server computer running a transaction routing service and an online challenge-response service. A transaction routing service is capable of routing online transactions between cardholders, issuers, and payment processing networks. A transaction routing service can also provide interfaces to various services. For example, it may provide an interface to an authentication service, a notification service, a third Party Data Source, a third party device identification service, etc. This disclosure often refers to the services offered by a TRS/Online C-R as being offered from the same server computer; however, one skilled in the art will recognize that it is possible to also break up the various services offered by a TRS/Online C-R so that they run on different computers.

In embodiments of the invention, the TRS/Online C-R, alone or in combination with other components (e.g., a risk scoring server) may comprise a processor, and a computer readable medium. The computer readable medium may comprise code, executable by the processor, for implementing a method comprising: a) receiving a request for consumer authentication at a server computer, the request including information about the transaction being conducted and information on an account being used to conduct the transaction; b) determining a risk score for the transaction at the server computer; c) sending an authentication challenge to the consumer when the risk score exceeds a threshold, the authentication challenge comprising a question whose response is dynamic or semi-dynamic; d) receiving a consumer response to the authentication challenge; e) comparing the response to an expected response; and f) authenticating the consumer conducting the transaction when the response and the consumer response are substantially the same A TRS/Online C-R component may contain several different modules. For example, it may include a device information module, a risk analyzer module, and a challenge optimizer module. A device information module may collect cardholder device information (e.g., IP address, browser version, browser language) and use the information to help determine the risk level of the transaction and use the information to help authenticate the cardholder. A risk analyzer module may assess a transaction risk level using device information, transaction characteristics, account characteristics, transaction history, or other relevant pieces of data. A risk analyzer module may also use other internal or third party services to help determine the risk level. A challenge optimizer module may analyze data such as the cardholder account, merchant, and transaction characteristics to determine an appropriate challenge question for each transaction. The challenge optimizer module may also validate the response. In the context of the disclosure below, the functionality is often represented as being managed by a single server computer. However, one skilled in the art will recognize that many of the functions can be broken up and managed by many different systems.

The risk score (which may be alternatively referred to as a risk level) may be of any suitable characteristic and may be determined (e.g., calculated) using any suitable procedure. A risk score may be characterized by a number or other type of label (e.g., low, medium, or high). The risk score may be calculated, or may be determined from prior data using a lookup table or the like. The risk score may be derived from the previously describer parameters (e.g., device information, transaction information, geographic location, etc) and other information.

In embodiments where an TRS/Online C-R is responsible for selecting a challenge, presenting a challenge to a cardholder, and validating the response from the cardholder, the TRS/Online C-R may have access to a challenge question engine. The TRS/Online C-R may also be in communication with a transaction history database and a challenge question database. The challenge question engine may extract challenge questions from the challenge question database. Alternatively or additionally, the challenge question engine may generate challenge questions using information in the transaction history database. The transaction history database may include transaction data for debit, credit, and pre-paid cards used by the cardholder or other individuals.

As used herein, in some embodiments, a notification server can refer to a server capable of sending a message (e.g., purchase confirmation, one time password, marketing offer, or any other type of message) to a cardholder device (e.g., PC, mobile phone, PDA, telephone). The message can be triggered by an event such as payment authorization, cardholder authentication attempt, meeting a defined threshold, etc. Embodiments of the invention may use a notification server to communicate with a consumer.

As used herein, in some embodiments, a "challenge" can refer the one or more questions based on cardholder personal information or previous transactions that are presented to a cardholder in an attempt to authenticate the cardholder conducting a transaction.

The challenges may also have static, semi-dynamic, or dynamic answers. For example, the question "What is your birthday?" requires a static answer, since the answer does not change. The question "What is your zip-code?" requires a semi-dynamic answer, since it could change or can change infrequently. Lastly, the question "What did you purchase yesterday at 4 pm?" would require a dynamic answer since the answer changes frequently. Thus, in preferred embodiments, the challenge questions would preferably be based on real time information that is easily accessible at the time of the transaction. By providing specific knowledge-based consumer challenges, the authentication of the consumer can be improved.

In some embodiments, a consumer may determine the kinds and/or quantity of challenge questions to ask himself or herself. For example, the consumer may specify that the consumer wants to be asked three challenge questions if the consumer visits a jewelry store, but only one question if the consumer visits a fast food restaurant. The types of questions posed by the consumer may be based on the merchant type, frequency of purchasing, etc.

As used herein, in some embodiments, "cardholder personal information" can refer to information about the consumer that can be obtained from a message exchange with or file from the issuer, a payment processing network, or another third party. Cardholder personal information can include information such as the last four digits of a social security number, a cardholder's birthday or zip code, address, previous address, schools attended, professional licenses obtained, relatives, type of vehicles owned, monthly payments for loans, etc.

As used herein, in some embodiments, "purchase transaction information" can refer to information related to the previous transactions conducted by a cardholder. For example, purchase transaction information may include information related to the merchants that participated in previous transactions, the location of previous transactions, the amount of previous transactions, etc. Transactions can include purchases, cash advances, disputes and returns/credits maintained by a payment processing network or an issuer.

FIGS. 1-14 illustrate various embodiments of systems along with the dataflow within those systems to implement an online challenge-response system in an integrated manner with an existing authentication system. The systems illustrated in FIGS. 1-14 share many common components and often have similar dataflows. Although not explicitly described, many of the communications shown in FIGS. 1-14 can be digitally signed using well-known techniques so that messages cannot be tampered with or altered by any of the parties that handle messages in transit. The embodiments illustrated in FIG. 1-14 shows the flexibility of embodiments of the invention.

Additionally, the embodiments illustrated in FIGS. 1-14 can be combined in numerous ways. For example, some issuers may prefer for a challenge to be issued on their behalf, while other issuers may wish to perform the challenge themselves. One skilled in the art will recognize that these types of combinations can be created by configuring the system to recognize these various permutations. Similarly, different dataflows can be used based on the merchant's preferences, cardholder's preferences, various regulations based on the location of the merchant, cardholder, issuer, etc. Many of the variables that can be used to determine the authentication dataflow used for a given transaction can come into play at once. For example, the authentication system may use one dataflow for a transaction being conducted in Europe with Issuer A, a second dataflow for a transaction being conducted in the United States with Issuer A, and a third data flow for a transaction being conducted in the United States with Issuer B. All of the possible dataflow configurations can be represented as a multi-dimension decision matrix. The dimensions of the matrix correspond to the variables used to determine the dataflow for a transaction, and the value at a particular matrix location corresponds to the particular data flow to be used.

Furthermore, details within a particular dataflow can also be determined by the decision matrix. For example, one issuer may wish to use dynamic challenges for transactions over $1000 and static challenges for transactions less than $1000. Another issuer may wish to use multiple dynamic and static challenges for transactions over $1000 while not using any challenge for transactions less than $1000. Still another issuer may want to rely on static challenges and password authentication. One skilled in the art will recognize that there are many different permutations of the authentication processes that can be used, and that each of these permutations can easily be configured and applied if represented in the system as a multi-dimensional matrix. A system attempting to determine the appropriate dataflow for a transaction simply needs to lookup the appropriate dataflow based on the relevant variables of the matrix. This process can occur quickly so that authentication can proceed as desired. Although this decision process may not be explicitly referenced in FIGS. 1-14, it should be understood that this process can occur at any point during the authentication processes described in FIGS. 1-14.

FIG. 1 depicts one exemplary embodiment. FIG. 1 illustrates the various components of an online challenge-response system that is integrated with a password-based authentication system. The messages that are transmitted between the various components of the system enable challenges to be used to authenticate cardholders conducting online transactions. In particular, FIG. 1 illustrates a challenge response that is conducted on behalf on an issuer.

In the embodiment illustrated in FIG. 1, the risk of a transaction is assessed and a challenge-response sequence is conducted if the risk of the transaction is above a defined risk-threshold. The cardholder's response to the challenge is validated, and the result of the challenge-response sequence is sent to the merchant. In the embodiment illustrated in FIG. 1, issuers do not have to modify any existing password-based authentication system components that may currently be deployed since the challenge-response is conducted on their behalf.

In step 11 in FIG. 1, a cardholder 1010, using an application such as a web browser on a suitable communication device, may initiate a purchase transaction with an e-commerce merchant 1020. Typically, the cardholder 1010 will visit a merchant server that hosts a website managed by the merchant 1020, select various items to buy, and conduct a standard online checkout process. During the checkout process, the cardholder 1010 will typically enter the account information of the payment account to be charged for the transaction.

In steps 12 and 13, an authentication process begins. The merchant 1020 attempts to locate an authentication service, if any, associated with the electronic commerce card issuer of the payment account of the cardholder 1010. A directory server 1030 can maintain a directory that specifies the location and capabilities of various card issuer systems. The capabilities of card issuer systems include whether the card issuer system supports authentication.

As shown in FIG. 1, the merchant 1020 may send a verifying enrollment request (VEReq) to a directory server 1030 to locate the appropriate card issuer system according to the specifications of the authentication system. The VEReq typically includes at least a portion of the electronic commerce card information. This information can be used by the directory server 1030 to identify the card issuer system associated with the cardholder's electronic commerce card. In an embodiment, all authentication-related communication is coordinated by a merchant plug-in 1025 integrated with the website managed by the merchant 1020. In an embodiment, each electronic commerce card issuer is assigned a different range of electronic commerce card numbers. In this embodiment, the directory server 1030 includes a list of all electronic commerce card issuers and their associated electronic commerce card number ranges. By comparing the electronic commerce card information with the list of electronic commerce card issuers, the directory server 1030 is able to identify the appropriate card issuer system.

It is at this point that the embodiment illustrated in FIG. 1 may begin a dataflow that differs from the dataflow of existing password-based authentication systems. According to some password-based authentication systems, after identifying the card issuer system, the directory server 1030 then determines if the card issuer supports password-based authentication. If the card issuer does not support password-based authentication, then the authentication process may be halted. If password-based authentication is supported, the directory server 1030 could then forward the VEReq to an access control server (ACS) 1050 associated with the card issuer's authentication service. The ACS 1050 could then determine whether the card information provided in the VEReq can be authenticated. Card information may not be able to be authenticated by the ACS 1050 if, for example, the card information does not include a valid electronic commerce card number, or if there is no authentication information, such as a password or other identifying information, associated with the electronic commerce card number.

If the electronic commerce card information provided in the VEReq can be authenticated (e.g., using a password, semi-static, or dynamic challenge), a verified enrollment response (VERes) can be generated. (It is noted that the challenge-response approach can be integrated with a password authentication approach, but it can also be implemented using similar transaction flows without password authentication-challenge-response can be implemented independent of password authentication.) The VERes includes a message indicating that the ACS 1050 can authenticate the electronic commerce card information and a pseudonym corresponding to the card number. The pseudonym can be any type of code or number that can be uniquely linked to card information by the ACS 1050 at a later time. The VERes also includes a URL to be accessed by the cardholder 1010 for authentication. The URL can be associated with a web site provided by the ACS 1050. Upon receiving a VERes from the ACS 1050, the directory server 1030 forwards the VERes to the merchant 1020.

In some later described embodiments, the VEReq/VERes sequence described above is carried out as above in order to proceed with a password-based authentication. However, in the embodiment illustrated in FIG. 1, the directory server 1030 may not contact the ACS 1050 at this step. In the embodiment illustrated in FIG. 1, the directory server 1030 has been configured to contact a transaction routing system/online challenge-response server (TRS/Online C-R) 1040. The TRS/Online C-R 1040 then generates a VERes that is configured for a challenge-response based authentication instead of a password-based authentication. The VERes can be sent back to the merchant 1020 in the same way that a VERes would be sent back to the merchant 1020 in a password-based authentication process. Subsequently, a payer authentication request sent by the merchant 1020 to the cardholder 1010 can be configured for the challenge-response process. For example, instead of including a URL associated with a web site provided by the ACS 1050, the URL may be associated with a URL associated with the TRS/Online C-R 1040 so that the TRS/Online C-R 1040 can issue a challenge to the cardholder 1010.

In step 14, the MPI 1025 redirects the cardholder 1010 to the TRS/Online C-R 1040 in order to authenticate the cardholder. This redirect can be based, at least in part, on information contained within the VERes. For example, the MPI 1025 can generate a payer authentication request (PAReq) based on information contained in the VERes, and the MPI 1025 can then send the generated PAReq to the cardholder 1010. A browser used by the cardholder 1010 can analyze the received PAReq and determine that the TRS/Online C-R 1040 should be contacted. According to various password-based authentication systems, the browser would contact an ACS 1050, instead of the TRS/Online C-R, at this step to begin a password authentication process.

In step 15, the TRS/Online C-R 1040 can analyze a plurality of factors to determine if a challenge-response authentication should be performed. Examples of such factors can include information regarding the device being used by the cardholder 1010 to perform the transaction, various transaction characteristics, such as amounts, transaction history, etc. In some cases, external systems such as a risk-scoring server 1090 or similar services may be invoked to establish a risk score or risk type for the transaction. Also certain issuers may wish to maintain a traditional password-based authentication system, some issuers would prefer to use challenge-response authentication, and some issuers may wish to perform both types of authentication. As previously explained, there can be many variables considered by the TRS/Online C-R 1040 to decide how to proceed with authentication. According to some embodiments, if the TRS/Online C-R 1040 determines that a challenge-response should not be used, then authentication may stop. Alternatively, authentication may proceed with a password-based authentication. If the TRS/Online C-R 1040 determines that a challenge-response authentication should be performed, a challenge question may be generated and sent to the cardholder 1010.

The cardholder 1010 may then respond to the challenge. In some cases, the response to the challenge question may be sent to the cardholder via separate channel, such as a mobile phone text message, while in other cases, the response will require information that should only be known by the cardholder. The TRS/Online C-R can then verify the response received from the cardholder 1010. Optionally, the authentication result can be sent to the issuer.

As previously mentioned, modules with the TRS/Online C-R 1040 may use modules such as a device information module, a risk analyzer module, and a challenge optimizer module to perform some of the various steps mentioned in step 15.

At step 16, the result of the cardholder authentication can be returned to the merchant 1020 through the cardholder 1010 in a payer authentication response (PARes). Furthermore, persistent records of the authentication transaction can be created and stored at step 17. As illustrated in FIG. 1, information concerning the authentication can be sent to an Authentication History Server (AHS) 1060. According to some embodiments, the AHS 1060 may confirm receipt of the information to the TRS/Online C-R 1040.

After receiving a valid authentication of the cardholder, the merchant system can then proceed at step 18 to perform a normal transaction authorization through its established acquirer 1070. The merchant can send the authentication results to the acquirer for use in authorization.

FIGS. 2-14 show many different variations on the system and process outlined in FIG. 1. Many steps that are similar to what was described in FIG. 1 will be only briefly described. It should be understood, however, that many of the steps in FIGS. 2-14 that are analogous to what was described in FIG. 1 and contain just as much complexity as what was described in FIG. 1.

Figure 2:
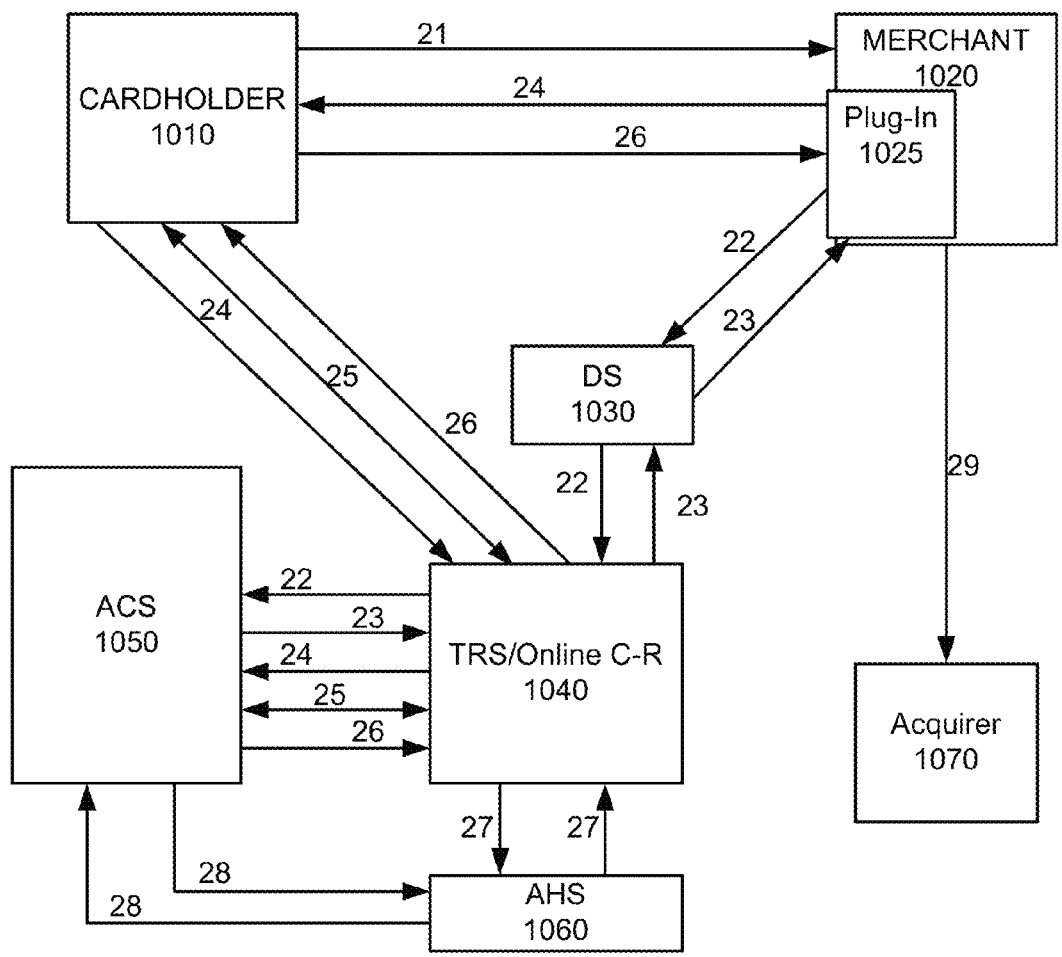

FIG. 2 depicts one exemplary embodiment. In particular, FIG. 2 illustrates an embodiment in which a risk level is determined and sent to an issuer. The issuer then conducts a challenge-response authentication.

At step 21, a cardholder 1010 conducts a transaction at an online merchant 1020.

At step 22, a VEReq is generated by an MPI 1025 and sent to a directory server 1030. The directory server 1030 forwards the VEReq to a TRS/Online C-R 1040. The TRS/Online C-R 1040 then forwards the VEReq to the appropriate ACS 1050 for the account being used in the transaction.

At step 23, the ACS 1050 responds to the VEReq with a VERes sent to the TRS/Online C-R 1040. The TRS/Online C-R 1040 forwards the VERes to the directory server 1030, and the directory server forwards the VERes to the merchant 1020.

At step 24, the merchant 1020 sends a PAReq to the cardholder 1010. The cardholder 1010 sends the PAReq to the TRS/Online C-R 1040, and the TRS/Online C-R 1040 determines a risk level for the transaction. In some embodiments, the TRS/Online may use a risk analyzer to determine the risk level. The risk level can be determined using many of the variables previously described. The TRS/Online C-R 1040 can then send the PAReq to the ACS 1050 along with the determined risk level.

At step 25, the ACS 1050 assesses risk level and presents challenge for high-risk transactions. If a challenge is received, the cardholder responds to the challenge. The ACS 1050 then validates the response. As shown in FIG. 2, the dataflow at step 25 flows through the TRS/Online-CR 1040. According to other embodiments, the ACS 1050 and cardholder 1010 may be in direct communication.

At step 26, a PARes is generated based on the response of the cardholder 1010 to the challenge. The ACS 1050 can send the PARes to the TRS/Online C-R 1040. The PARes can then be sent to the merchant 1020 via the cardholder 1010.

At step 27, the PARes can be sent to the AHS 1060 from the TRS/Online C-R 1040 for later use. Additionally or alternatively at step 28, the ACS 1050 can send data to be archived to the AHS 1060.

At step 29, the merchant 1020 validates that the PARes has not been altered and forwards an authorization request containing authentication results to the acquirer 1070.

Figure 3:
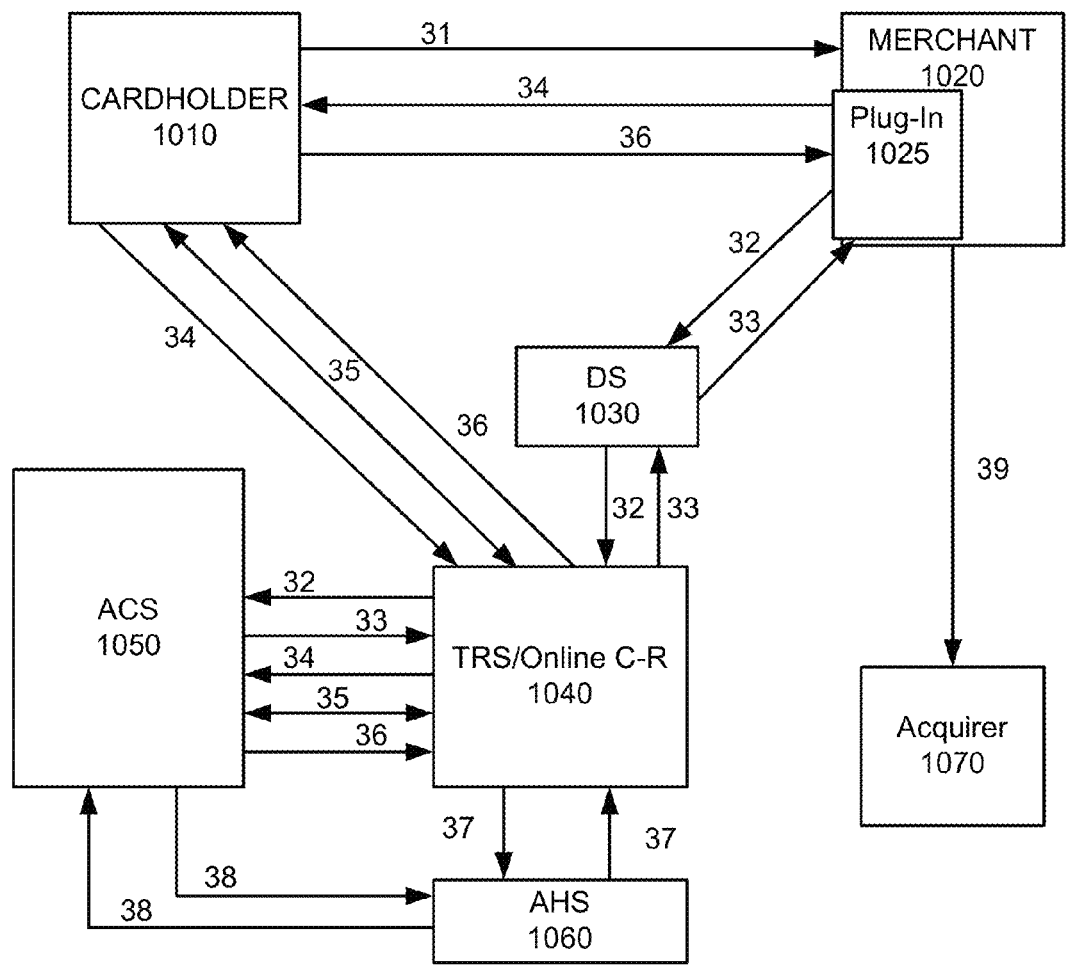

FIG. 3 depicts one exemplary embodiment. In particular, FIG. 3 illustrates an embodiment in which the issuer determines the risk level and performs challenge-response sequence using an existing password-based authentication platform to conduct challenge-response process. The password-based authentication platform does not need to be modified in this embodiment. Variations of this embodiment could be implemented without using a TRS/Online C-R.

At step 31, a cardholder 1010 conducts a transaction at an online merchant 1020.

At step 32, a VEReq is generated by an MPI 1025 and sent to a directory server 1030. The directory server 1030 forwards the VEReq to a TRS/Online C-R 1040. The TRS/Online C-R 1040 then forwards the VEReq to the appropriate ACS 1050 for the account being used in the transaction.

At step 33, the ACS 1050 responds to the VEReq with a VERes sent to the TRS/Online C-R 1040. The TRS/Online C-R 1040 forwards the VERes to the directory server 1030, and the directory server forwards the VERes to the merchant 1020.

At step 34, the merchant 1020 sends a PAReq to the cardholder 1010. The cardholder 1010 sends the PAReq to the TRS/Online C-R 1040, and the TRS/Online C-R 1040 can then send the PAReq to the ACS 1050.

At step 35, the ACS 1050 determines and assesses risk level and presents challenge for high-risk transactions. If a challenge is received, the cardholder responds to the challenge. The ACS 1050 then validates the response. As shown in FIG. 3, the dataflow at step 35 flows through the TRS/Online-CR 1040. According to other embodiments, the ACS 1050 and cardholder 1010 may be in direct communication.

At step 36 a PARes is generated based on the response of the cardholder 1010 to the challenge. The ACS 1050 sends PARes to TRS/Online C-R 1040. The PARes can then be sent to the merchant 1020 via the cardholder 1010.

At step 37, the PARes can be sent to the AHS 1060 from the TRS/Online C-R 1040 for later use. Additionally or alternatively at step 38, the ACS 1050 can send data to be archived to the AHS 1060.

At step 39, the merchant 1020 validates that the PARes has not been altered and forwards an authorization request containing authentication results to the acquirer 1070.

Figure 4:
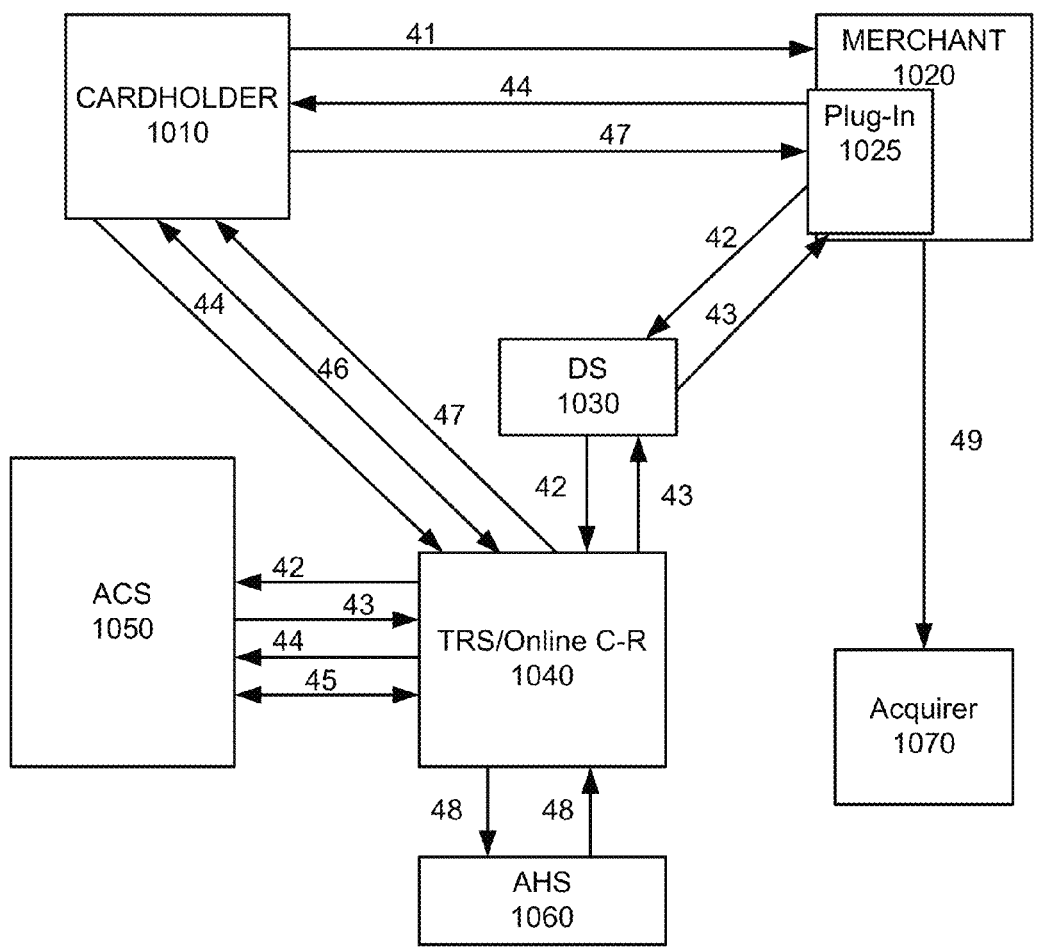

FIG. 4 depicts one exemplary embodiment. In particular, FIG. 4 illustrates an embodiment in which a challenge is presented by the TRS/Online C-R when the issuer is not able to authenticate a cardholder using a password-based authentication process. As used herein, an "attempted" authentication refers to the situation where an issuer is unable to authenticate a cardholder using a password-based authentication process. As previously mentioned, there are a number of reasons why an issuer may be unable to authenticate a cardholder. For example, a cardholder may not have established a password for the account used in a transaction. More information on attempted authentications can be found in U.S. Pat. No. 7,039,611, which is incorporated in its entirety for all purposes. According to various embodiments, all attempted authentications can be authenticated using a challenge-response. Alternatively, only attempted transactions above a certain risk threshold may be authenticated using a challenge-response.

At step 41, a cardholder 1010 conducts a transaction at an online merchant 1020.

At step 42, a VEReq is generated by an MPI 1025 and sent to a directory server 1030. The directory server 1030 forwards the VEReq to a TRS/Online C-R 1040. The TRS/Online C-R 1040 then forwards the VEReq to the appropriate ACS 1050 for the account being used in the transaction.

At step 43, the ACS 1050 responds to the VEReq with a VERes sent to TRS/Online C-R 1040. The TRS/Online C-R 1040 forwards the VERes to the directory server 1030, and the directory server forwards the VERes to the merchant 1020.

At step 44, the merchant 1020 sends a PAReq to the cardholder 1010. The cardholder 1010 sends the PAReq to the TRS/Online C-R 1040, and the TRS/Online C-R 1040 can then send the PAReq to the ACS 1050.

At step 45, the ACS 1050 may determine that it is unable to authenticate the cardholder 1050 using a password-based authentication, and creates an "attempted authentication" response. For example, the cardholder 1050 may not be able to be authenticated because the cardholder has not configured a password for the account being used to conduct the transaction. According to some embodiments, it may be determined at an earlier time that password authentication cannot occur. For example, at step 42 it may be determined that the ACS 1050 is not capable of performing password-based authentication. Regardless of how or when it is determined that password-based authentication cannot occur, the TRS/Online C-R 1040 is informed that password-based authentication cannot occur at step 45.

At step 46, the TRS/Online C-R 1040 conducts challenge-response authentication for attempted authenticated transactions. The TRS/Online C-R 1040 may determine the risk-level on the attempted authenticated transaction. The TRS/Online C-R 1040 may then present a question if the attempted transaction is a high-risk transaction. Alternatively, all attempted transactions may be presented a question. The TRS/Online C-R 1040 can then validate the response received from the cardholder 1010.

At step 47 a PARes is generated based on the response of the cardholder 1010 to the challenge by the TRS/Online C-R 1040. The PARes can then be sent to the merchant 1020 via the cardholder 1010.

At step 48, the PARes can be sent to the AHS 1060 from the TRS/Online C-R 1040 for later use.

At step 49, the merchant 1020 validates that the PARes has not been altered and forwards an authorization request containing authentication results to the acquirer 1070.

Figure 5:
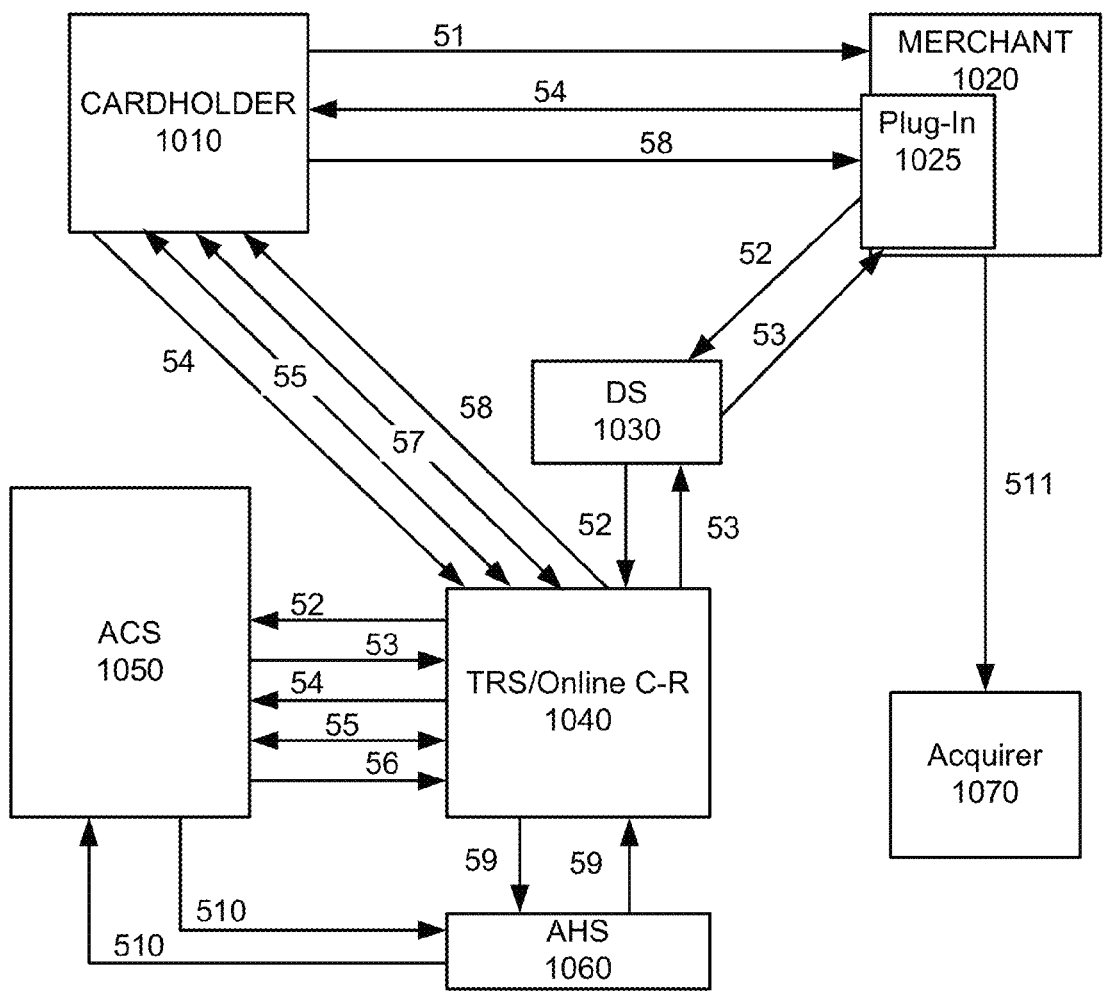

FIG. 5 depicts one exemplary embodiment. In particular, FIG. 5 illustrates an embodiment in which a challenge is presented for transactions that have also been authenticated using a password-based authentication. A challenge can be presented for transactions above a certain risk threshold. The challenge can be presented in addition to the issuer validating the password, and thus the embodiment illustrated in FIG. 5 provides an additional layer of security. The challenge can be presented after the issuer has authenticated the cardholder using the password-based authentication.

At step 51, a cardholder 1010 conducts a transaction at an online merchant 1020.

At step 52, a VEReq is generated by an MPI 1025 and sent to a directory server 1030. The directory server 1030 forwards the VEReq to a TRS/Online C-R 1040. The TRS/Online C-R 1040 then forwards the VEReq to the appropriate ACS 1050 for the account being used in the transaction.

At step 53, the ACS 1050 responds with a VERes to TRS/Online C-R 1040. The TRS/Online C-R 1040 forwards the VERes to the directory server 1030, and the directory server forwards the VERes to the merchant 1020.

At step 54, the merchant 1020 sends a PAReq to the cardholder 1010. The cardholder 1010 sends the PAReq to the TRS/Online C-R 1040, and the TRS/Online C-R 1040 can then send the PAReq to the ACS 1050.

At step 55, as previously described in relation to password-based authentication processes, the ACS 1050 authenticates cardholder's 1010 password via an exchange with the cardholder 1010. The exchange may occur via the TRS/Online C-R or it may occur directly between the ACS 1050 and the cardholder 1050. Additional information on this password exchange can be found, for example, in U.S. Pat. No. 7,039,611.

At step 56 a PARes is generated based on the password-based authentication of the cardholder 1010. The ACS 1050 sends PARes to TRS/Online C-R 1040.

At step 57, the TRS/Online C-R 1040 conducts a challenge-response sequence for the password-authenticated transaction. The TRS/Online C-R 1040 may determine the risk-level of the password-authenticated transaction. The TRS/Online C-R 1040 may then present one or more questions if the transaction is a high-risk transaction. The TRS/Online C-R 1040 can then validate the response from the cardholder 101.

At step 58, another PARes is generated by the TRS/Online C-R 1040 based on the response of the cardholder 1010 to the challenge. The PARes can then be sent to the merchant 1020 via the cardholder 1010.

At step 59, the PARes can be sent to the AHS 1060 from the TRS/Online C-R 1040 for later use. Additionally or alternatively at step 510, the ACS 1050 can send data to be archived to the AHS 1060.

At step 511, the merchant 1020 validates that the PARes has not been altered and forwards an authorization request containing authentication results to the acquirer 1070.

Figure 6:
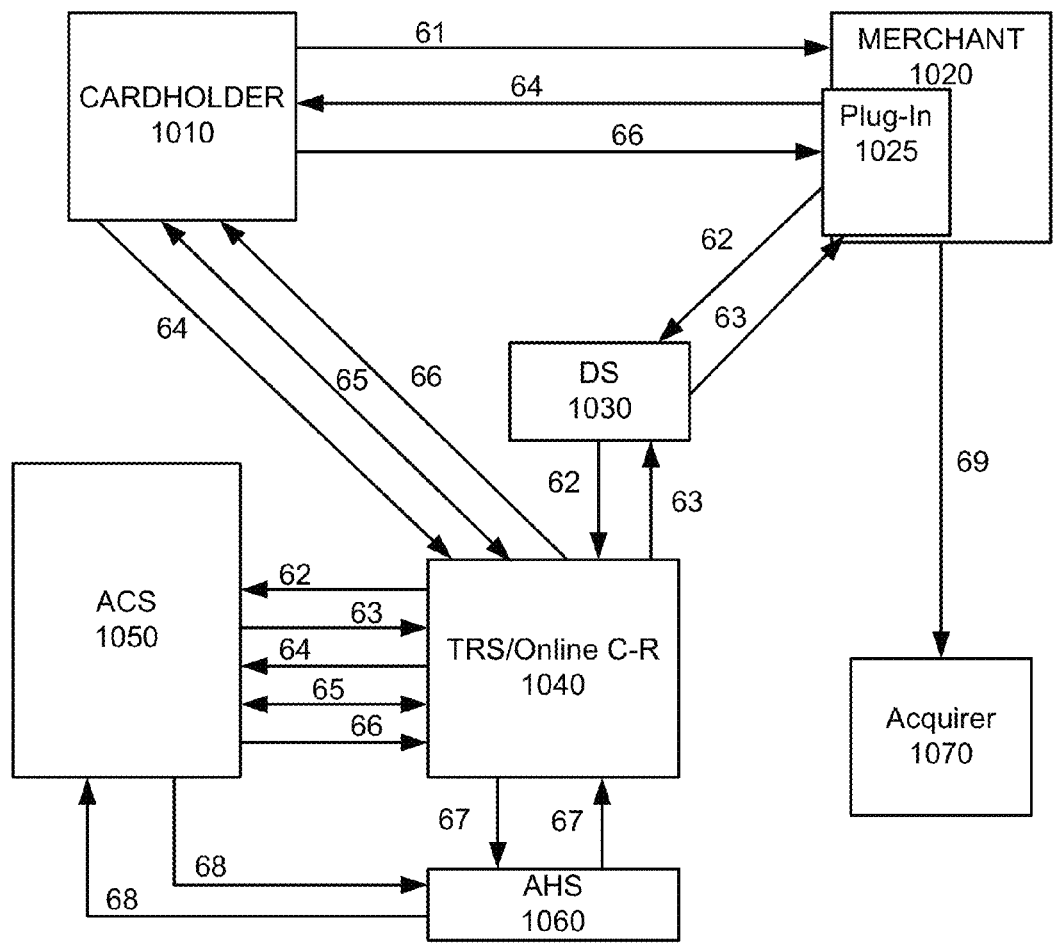

FIG. 6 depicts one exemplary embodiment. In particular, FIG. 6 illustrates an embodiment similar to the embodiment illustrated in FIG. 5, except that in FIG. 6 the challenge is presented while the issuer is authenticating the cardholder.

At step 61, a cardholder 1010 conducts a transaction at an online merchant 1020.

At step 62, a VEReq is generated by an MPI 1025 and sent to a directory server 1030. The directory server 1030 forwards the VEReq to a TRS/Online C-R 1040. The TRS/

Online C-R 1040 then forwards the VEReq to the appropriate ACS 1050 for the account being used in the transaction.

At step 63, the ACS 1050 responds with a VERes to TRS/Online C-R 1040. The TRS/Online C-R 1040 forwards the VERes to the directory server 1030, and the directory server forwards the VERes to the merchant 1020.

At step 64, the merchant 1020 sends a PAReq to the cardholder 1010. The cardholder 1010 sends the PAReq to the TRS/Online C-R 1040, and the TRS/Online C-R 1040 can then send the PAReq to the ACS 1050.

At step 65, the password-based and challenge-response authentication process begin in parallel. The ACS 1050 authenticates cardholder's 1010 password via an exchange with cardholder 1010 that can occur through the TRS/Online C-R 1040. Meanwhile, the TRS/Online C-R 1040 determines the risk level of the transaction and inserts a challenge into the ACS 1050 password validation step for high-risk transactions. For example, when the ACS requests that the cardholder submit the password associated with the account used in the transaction, the TRS/Online C-R, when forwarding this request, can add a challenge to this password request. The TRS/Online C-R 1040 can validate the response to challenge and send authentication result to ACS 1050. The ACS 1050 can also validate the password submitted by the cardholder 1010.

At step 66, a PARes can be generated based on the response of the cardholder 1010 to the challenge and on the response of the cardholder 1010 to the password-based authentication. The PARes can then be sent to the merchant 1020 via the cardholder 1010. In one embodiment, the ACS 1050 is informed of the result of the challenge-response and generates the PARes. In another embodiment, the TRS/Online C-R 1040 is informed of the result of the password-based authentication and generates the PARes.

At step 67, the PARes can be sent to the AHS 1060 from the TRS/Online C-R 1040 for later use. Additionally or alternatively at step 68, the ACS 1050 can send data to be archived to the AHS 1060.

At step 69, the merchant 1020 validates that the PARes has not been altered and forwards an authorization request containing authentication results to the acquirer 1070.

Figure 7:
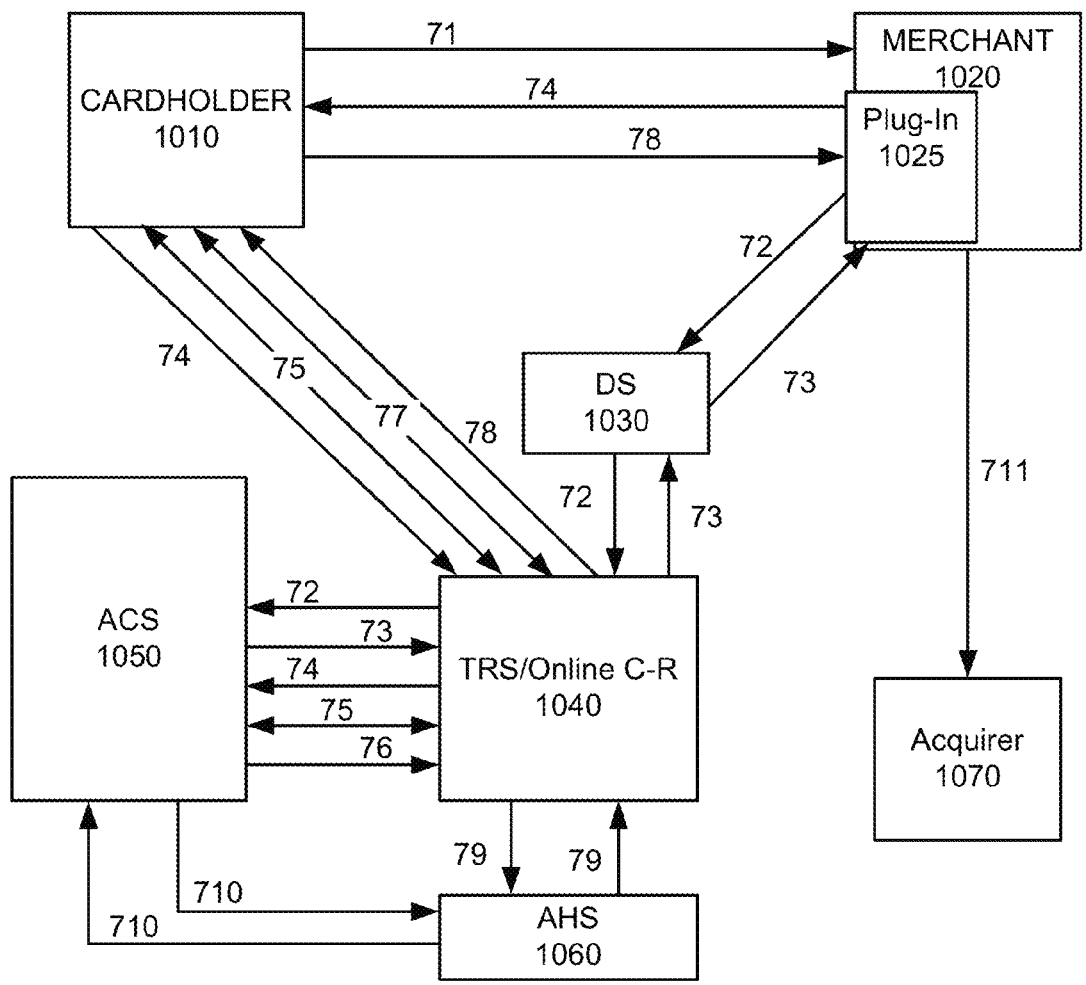

FIG. 7 depicts one exemplary embodiment. In particular, FIG. 7 illustrates an embodiment in which a challenge is presented while a cardholder enrolls in a password-based authentication during the course of conducting a transaction. As with other embodiments, a challenge can be presented for transactions above a certain risk threshold. The challenge is presented in addition to the issuer validating other cardholder responses in order to provide an additional layer of security.

At step 71, a cardholder 1010 conducts a transaction at an online merchant 1020.

At step 72, a VEReq is generated by an MPI 1025 and sent to a directory server 1030. The directory server 1030 forwards the VEReq to a TRS/Online C-R 1040. The TRS/Online C-R 1040 then forwards the VEReq to the appropriate ACS 1050 for the account being used in the transaction.

At step 73, the ACS 1050 responds with a VERes to TRS/Online C-R 1040. The TRS/Online C-R 1040 forwards the VERes to the directory server 1030, and the directory server forwards the VERes to the merchant 1020.

At step 74, the merchant 1020 sends a PAReq to the cardholder 1010. The cardholder 1010 sends the PAReq to the TRS/Online C-R 1040, and the TRS/Online C-R 1040 can then send the PAReq to the ACS 1050.

At step 75, the ACS 1050 authenticates that the cardholder 1010 is an authorized user of the account used in the transaction using well-known means. The ACS 1050 then allows the cardholder 1010 to create a password that can be used for future password-based authentication. In the embodiment illustrated in FIG. 7, this communication takes place through the TRS/Online C-R 1040, but in other embodiments, the ACS 1050 may communicate directly with the cardholder 1010.

At step 76, a PARes is generated based on the enrollment of the cardholder 1010. The ACS 1050 sends PARes to TRS/Online C-R 1040.

At step 77, the TRS/Online C-R 1040 can determine the risk level of the transaction and present a challenge to the cardholder 1010 for high-risk transactions. The TRS/Online C-R 1040 can validate the response to challenge.

At step 78, a PARes can be generated based on the response of the cardholder 1010 to the challenge. The PARes can then be sent to the merchant 1020 via the cardholder 1010.

At step 79, the PARes can be sent to the AHS 1060 from the TRS/Online C-R 1040 for later use. Additionally or alternatively at step 710, the ACS 1050 can send data to be archived to the AHS 1060.

At step 711, the merchant 1020 validates that the PARes has not been altered and forwards an authorization request containing authentication results to the acquirer 1070.

Figure 8:
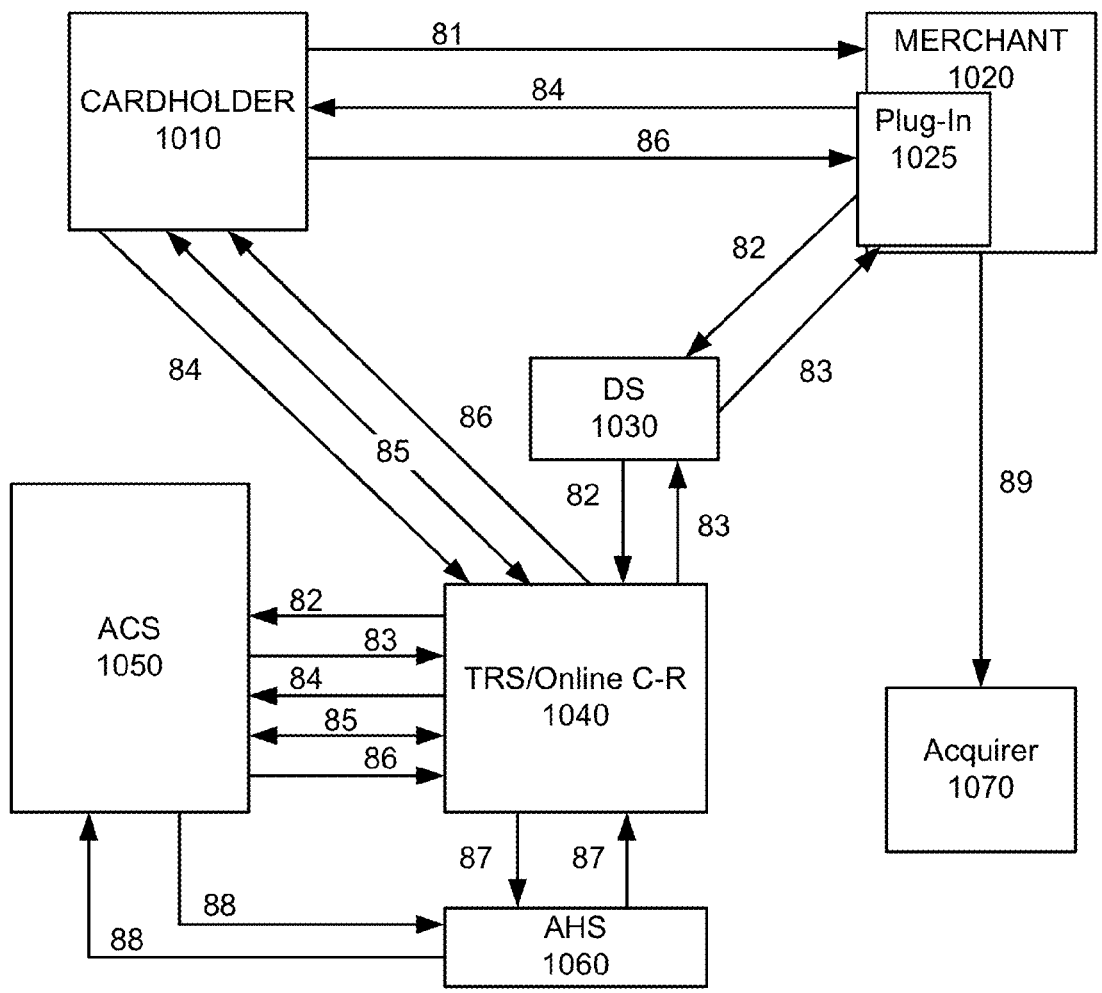

FIG. 8 depicts one exemplary embodiment. In particular, FIG. 8 illustrates an embodiment, similar to the embodiment illustrated in FIG. 7, in which a challenge is presented while a cardholder enrolls in a password-based authentication during the course of conducting a transaction. The difference in FIG. 8 is that the challenge is presented to the cardholder as a part of the authentication used to create the password. As with other embodiments, a challenge can be presented for transactions above a certain risk threshold. This approach provides an additional layer of security for the enrollment process.

At step 81, a cardholder 1010 conducts a transaction at an online merchant 1020.

At step 82, a VEReq is generated by an MPI 1025 and sent to a directory server 1030. The directory server 1030 forwards the VEReq to a TRS/Online C-R 1040. The TRS/Online C-R 1040 then forwards the VEReq to the appropriate ACS 1050 for the account being used in the transaction.

At step 83, the ACS 1050 responds with a VERes to TRS/Online C-R 1040. The TRS/Online C-R 1040 forwards the VERes to the directory server 1030, and the directory server forwards the VERes to the merchant 1020.

At step 84, the merchant 1020 sends a PAReq to the cardholder 1010. The cardholder 1010 sends the PAReq to the TRS/Online C-R 1040, and the TRS/Online C-R 1040 can then send the PAReq to the ACS 1050.

At step 85, the ACS 1050 authenticates that the cardholder 1010 is an authorized user of the account used in the transaction using well-known means. The TRS/Online C-R 1040 can then determine the risk level of the transaction and present a challenge to the cardholder 1010 for high-risk transactions. The TRS/Online C-R 1040 can validate the response to challenge and inform the ACS 1050 of the result of the challenge-response. The ACS 1050 can then use the result of the challenge to help determine whether to allow the cardholder 1010 to create a password that can be used for future password-based authentication. In the embodiment illustrated in FIG. 8, the communications that take place during this step are transmitted through the TRS/Online C-R 1040, but in other embodiments, the ACS 1050 may communicate directly with the cardholder 1010 for some of the various communications involved in step 85.

At step 86, a PARes is generated based on the enrollment of the cardholder 1010. The ACS 1050 sends PARes to TRS/Online C-R 1040. The PARes can then be sent to the merchant 1020 via the cardholder 1010.

At step 87, the PARes can be sent to the AHS 1060 from the TRS/Online C-R 1040 for later use. Additionally or alternatively at step 88, the ACS 1050 can send data to be archived to the AHS 1060.

At step 89, the merchant 1020 validates that the PARes has not been altered and forwards an authorization request containing authentication results to the acquirer 1070.

Figure 9:
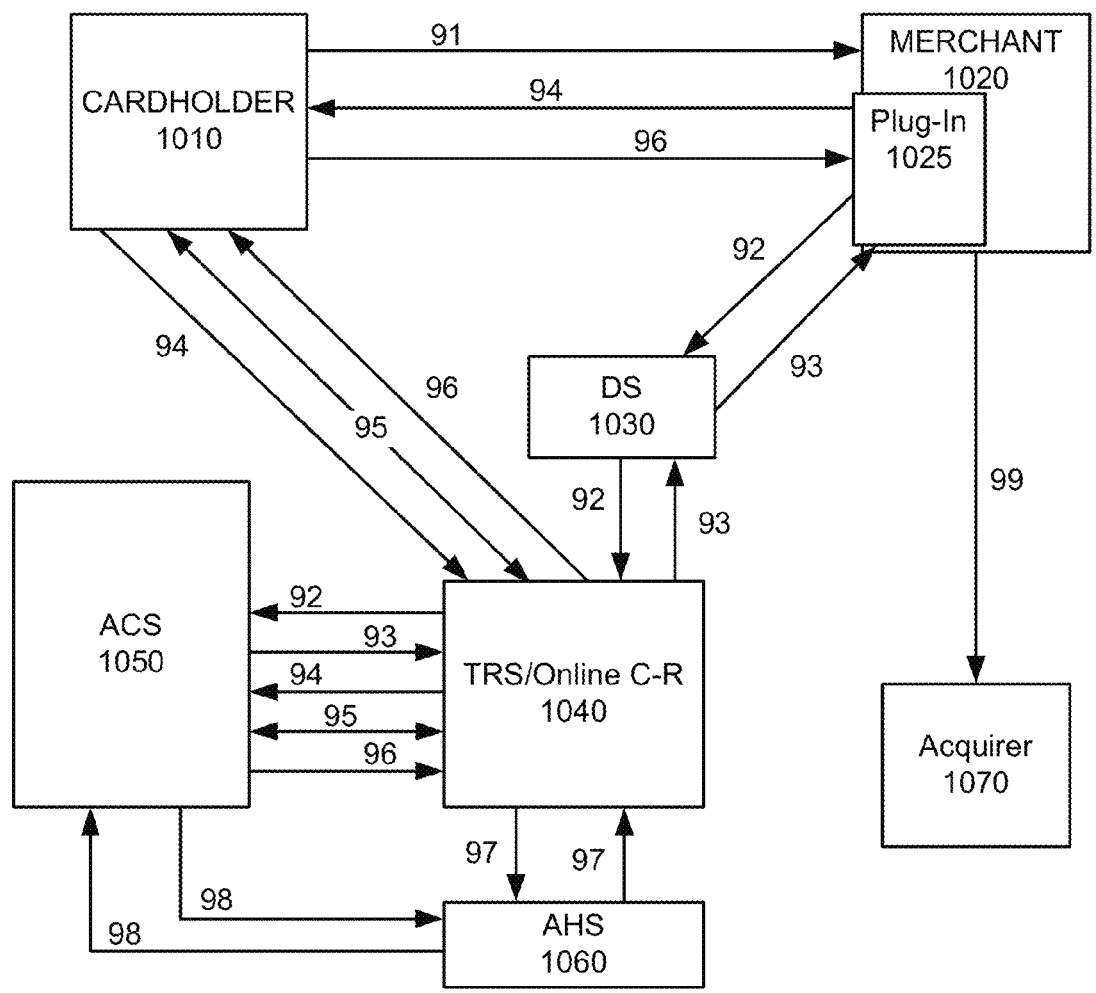

FIG. 9 depicts one exemplary embodiment. In particular, FIG. 9 illustrates an embodiment in which a challenge is presented while a cardholder goes through a password recovery process in a password-based authentication system during the course of conducting a transaction. The challenge is presented in addition to other issuer questions. As with other embodiments, a challenge can be presented for transactions above a certain risk threshold. This approach provides an additional layer of security for the re-activating process. One skilled in the art will recognize based on this description, and on the other previous descriptions, that a challenge could alternatively be presented simultaneously with an issuer's questions during a password recovery process or in place of an issuer's questions during a password recovery process.

At step 91, a cardholder 1010 conducts a transaction at an online merchant 1020.

At step 92, a VEReq is generated by an MPI 1025 and sent to a directory server 1030. The directory server 1030 forwards the VEReq to a TRS/Online C-R 1040. The TRS/Online C-R 1040 then forwards the VEReq to the appropriate ACS 1050 for the account being used in the transaction.

At step 93, the ACS 1050 responds with a VERes to TRS/Online C-R 1040. The TRS/Online C-R 1040 forwards the VERes to the directory server 1030, and the directory server forwards the VERes to the merchant 1020.

At step 94, the merchant 1020 sends a PAReq to the cardholder 1010. The cardholder 1010 sends the PAReq to the TRS/Online C-R 1040, and the TRS/Online C-R 1040 can then send the PAReq to the ACS 1050.

At step 95, the cardholder 1010 begins a password recovery process, and the ACS 1050 authenticates cardholder 1010 via a question exchange with the cardholder 1010. This transaction flow may take place via the TRS/Online C-R 1040. The TRS/Online C-R 1040 also determines the risk-level of the transaction and may insert additional challenge-questions in sequence if the risk level exceeds a threshold. The TRS/Online CR can validate the cardholder's 1010 challenge responses, and sends result to ACS 1050. The ACS 1050 can then determine whether to allow the cardholder 101 to reset their password based on the response to the issuer's questions and on the result of the challenge-response.

At step 96, a PARes is generated based on the password reset of the cardholder 1010. The ACS 1050 sends PARes to TRS/Online C-R 1040. The PARes can then be sent to the merchant 1020 via the cardholder 1010.

At step 97, the PARes can be sent to the AHS 1060 from the TRS/Online C-R 1040 for later use. Additionally or alternatively at step 98, the ACS 1050 can send data to be archived to the AHS 1060.

At step 99, the merchant 1020 validates that the PARes has not been altered and forwards an authorization request containing authentication results to the acquirer 1070.

Figure 10:
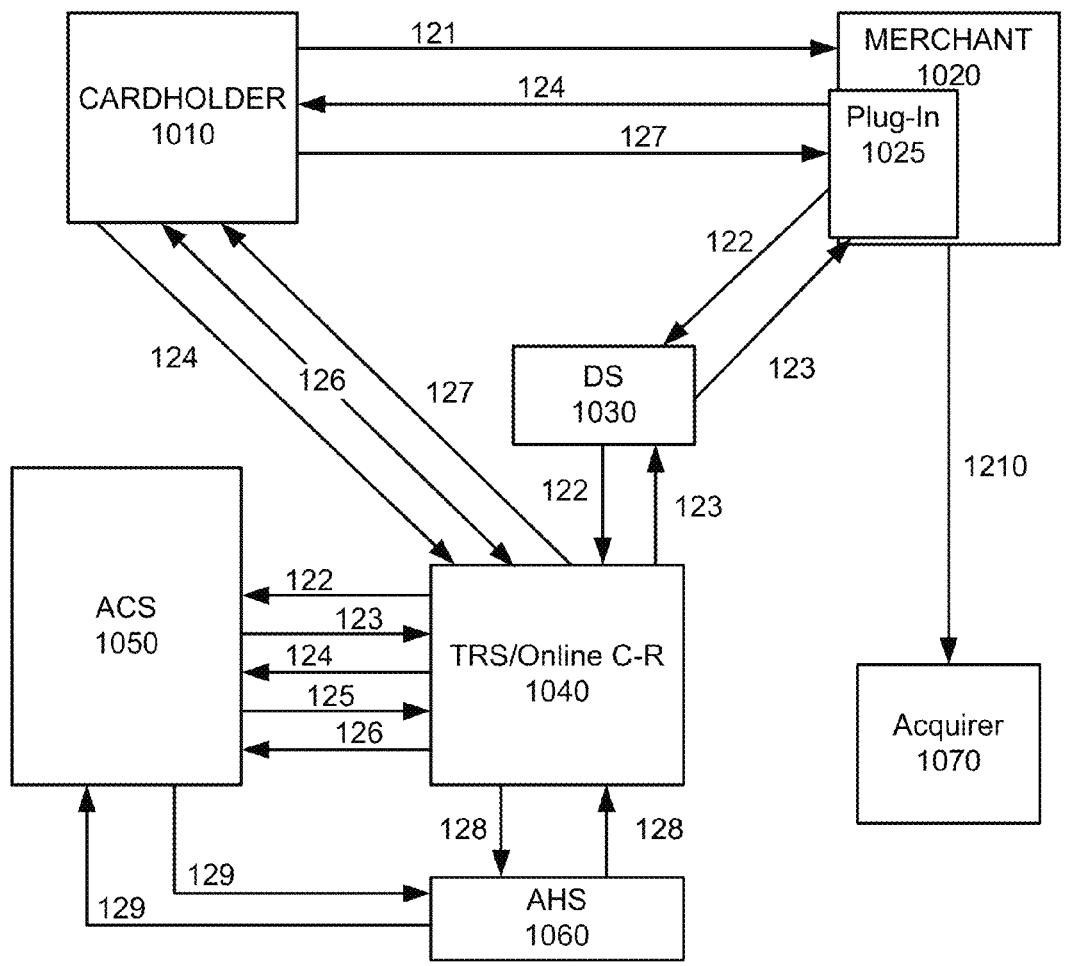

FIG. 10 depicts one exemplary embodiment. In particular, FIG. 10 illustrates an embodiment in which a challenge is presented in place of any authentication conducted by the issuer when the issuer is unable to authenticate the cardholder. This embodiment is similar to the "attempted" authentication embodiment except that no "attempted" authentication response is generated.

At step 121, a cardholder 1010 conducts a transaction at an online merchant 1020.

At step 122, a VEReq is generated by an MPI 1025 and sent to a directory server 1030. The directory server 1030 forwards the VEReq to a TRS/Online C-R 1040. The TRS/Online C-R 1040 then forwards the VEReq to the appropriate ACS 1050 for the account being used in the transaction.

At step 123, the ACS 1050 responds with a VERes to TRS/Online C-R 1040. The TRS/Online C-R 1040 forwards the VERes to the directory server 1030, and the directory server forwards the VERes to the merchant 1020.

At step 124, the merchant 1020 sends a PAReq to the cardholder 1010. The cardholder 1010 sends the PAReq to the TRS/Online C-R 1040, and the TRS/Online C-R 1040 can then send the PAReq to the ACS 1050.

At step 125, the ACS 1050 is unable to authenticate the cardholder 1010 and creates an authentication request. The authentication request is sent to the TRS/Online C-R 1040 and to request that the TRS/Online C-R 1040 authenticate the cardholder 1010 on behalf of the ACS 1050.

At step 126, the TRS/Online C-R 1040 conducts challenge-response authentication for the transaction. The TRS/Online C-R 1040 may determine the risk-level of the transaction. The TRS/Online C-R 1040 may then present a question if the transaction is a high-risk transaction. Alternatively, all transactions may be presented a question. The TRS/Online C-R 1040 can then validate the response received from the cardholder 1010. The result of the validation can be sent to the ACS 1050.

At step 127, a PARes is generated based on the response of the cardholder 1010 to the challenge by the TRS/Online C-R 1040. The PARes can then be sent to the merchant 1020 via the cardholder 1010.

At step 128, the PARes can be sent to the AHS 1060 from the TRS/Online C-R 1040 for later use. Additionally or alternatively at step 129, the ACS 1050 can send data to be archived to the AHS 1060.

At step 1210, the merchant 1020 validates that the PARes has not been altered and forwards an authorization request containing authentication results to the acquirer 1070.

Figure 11:
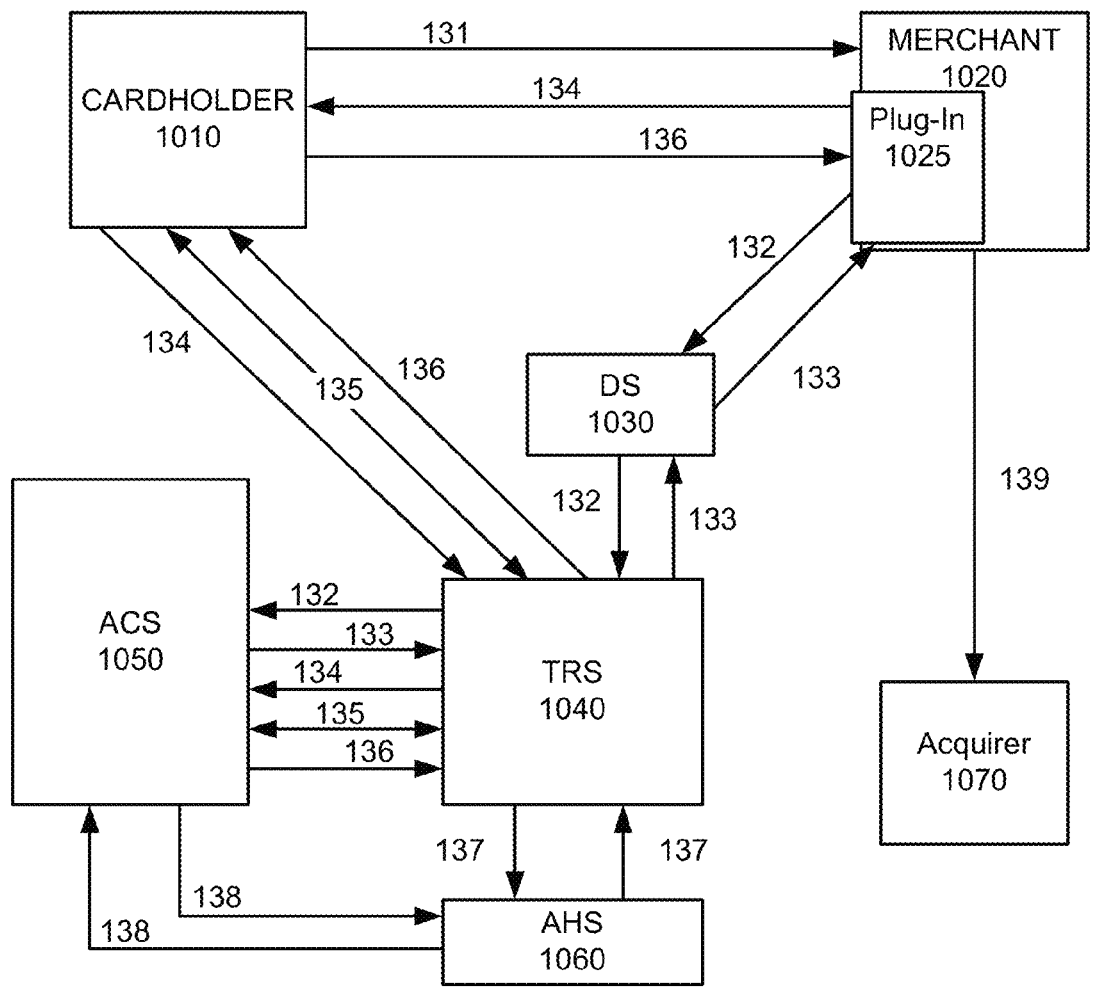

FIG. 11 depicts one exemplary embodiment. In particular, FIG. 11 illustrates an embodiment in which cardholder device information is collected on password-based authentications that pass through the system. This information could be used real-time in determining the risk-level of a transaction, or could be used to help authenticate the cardholder, or could be used for offline forensic analysis.

At step 131, a cardholder 1010 conducts a transaction at an online merchant 1020.

At step 132, a VEReq is generated by an MPI 1025 and sent to a directory server 1030. The directory server 1030 forwards the VEReq to a TRS/Online C-R 1040. The TRS/Online C-R 1040 then forwards the VEReq to the appropriate ACS 1050 for the account being used in the transaction.

At step 133, the ACS 1050 responds with a VERes to TRS/Online C-R 1040. The TRS/Online C-R 1040 forwards the VERes to the directory server 1030, and the directory server forwards the VERes to the merchant 1020.

At step 134, the merchant 1020 sends a PAReq to the cardholder 1010. The cardholder 1010 then sends the PAReq to the TRS/Online C-R 1040. At this point, the TRS/Online C-R 1040 can collect cardholder 1010 device information.

For example, if the cardholder 1010 is using a web browser on a personal computer, the TRS/Online C-R 1040 may collect the IP address, browser version, and other similar information. If the cardholder 1010 is using a device such as a mobile phone, then the mobile phone number may be collected. One skilled in the art will recognize that many different pieces of device information can be gathered depending on the device. Additionally, a module such as a device information module within the TRS/Online C-R 1040 may perform the device information gathering. The transaction risk could also be assessed using the device information, transaction characteristics, account characteristics, and transaction history. TRS/Online C-R 1040 can pass device information and risk information to ACS 1050 in a PAReq or could send this information to the merchant 1020 in a PARes. At this point, the TRS/Online C-R 1040 can then send the PAReq to the ACS 1050.

At step 135, as previously described in relation to password-based authentication processes, the ACS 1050 authenticates cardholder's 1010 password via an exchange with the cardholder 1010. The exchange may occur via the TRS/Online C-R or it may occur directly between the ACS 1050 and the cardholder 1050. The ACS 1050 can use the device and risk information to help in making an authentication decision.

At step 136, a PARes is generated based on the authentication decision made by the ACS 1050. The PARes can be sent from the ACS 1050 to the TRS/Online C-R 1040. The PARes can then be sent to the merchant 1020 via the cardholder 1010.

At step 137, the PARes can be sent to the AHS 1060 from the TRS/Online C-R 1040 for later use. Additionally or alternatively at step 138, the ACS 1050 can send data to be archived to the AHS 1060.

At step 139, the merchant 1020 validates that the PARes has not been altered and forwards an authorization request containing authentication results to the acquirer 1070.

Figure 12:
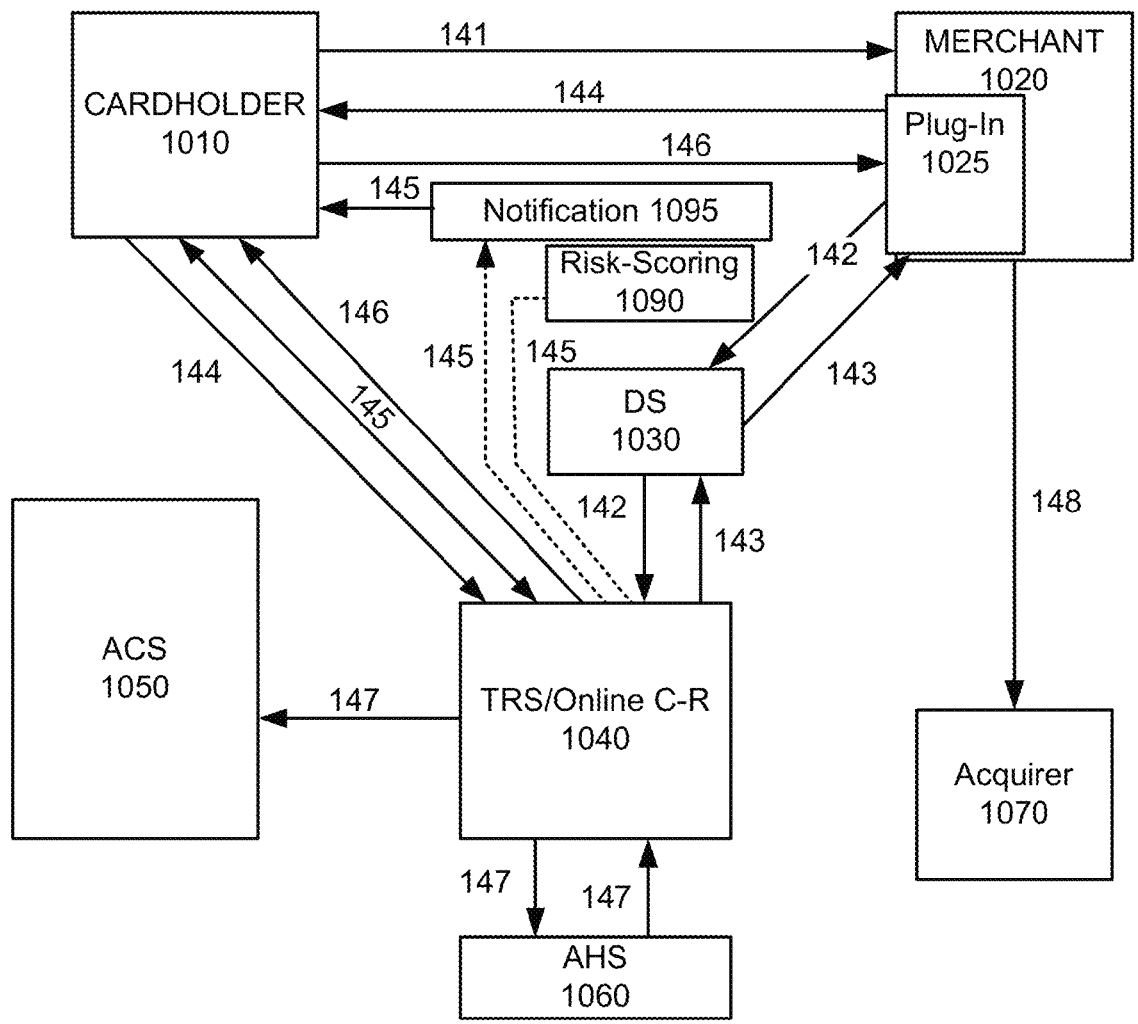

FIG. 12 depicts one exemplary embodiment. In particular, FIG. 12 illustrates an embodiment a one-time password (OTP) is sent to the cardholder. An OTP can be sent to the cardholder via text message, e-mail, or telephone call. The cardholder enters OTP in a challenge screen and the OTP can be verified to authenticate the cardholder. Note, the OTP will be different each time the process is used for each transaction, thus this approach provides a higher level of security by using a dynamic password.

At step 141, a cardholder 1010 conducts a transaction at an online merchant 1020.

At step 142, a VEReq is generated by an MPI 1025 and sent to a directory server 1030. The directory server 1030 forwards the VEReq to a TRS/Online C-R 1040.

At step 143, the TRS/Online C-R 1040 responds with a VERes to the directory server 1030, and the directory server forwards the VERes to the merchant 1020.

At step 144, the merchant 1020 sends a PAReq to the cardholder 1010. The cardholder 1010 sends the PAReq to the TRS/Online C-R 1040.

At step 145, the TRS/Online C-R 1040 collects cardholder device information, assesses transaction risk using the device information, transaction characteristics, account characteristics, and transaction history, and presents a challenge for higher-risk transactions. The TRS/Online C-R 1040 may request risk information from risk-scoring server 1090. The TRS/Online C-R 1040 also sends a message to inform a notification server 1095 to send a one-time password to the cardholder 1010. OTP may be transmitted as email, text message to phone or other device, or voice message to phone. The cardholder 1010 can then enter the OTP into challenge page. The TRS/Online C-R 1040 can validate the OTP.

At step 146, a PARes is generated based on the validation made by the TRS/Online C-R 1040. The PARes can be sent from the TRS/Online C-R 1040 to the merchant 1020 via the cardholder 1010.

At step 147, the PARes can be sent to the AHS 1060 from the TRS/Online C-R 1040 for later use. TRS/Online C-R 1040 may also forward a copy of PARes to the ACS 1050.

At step 148, the merchant 1020 validates that the PARes has not been altered and forwards an authorization request containing authentication results to the acquirer 1070.

Figure 13:
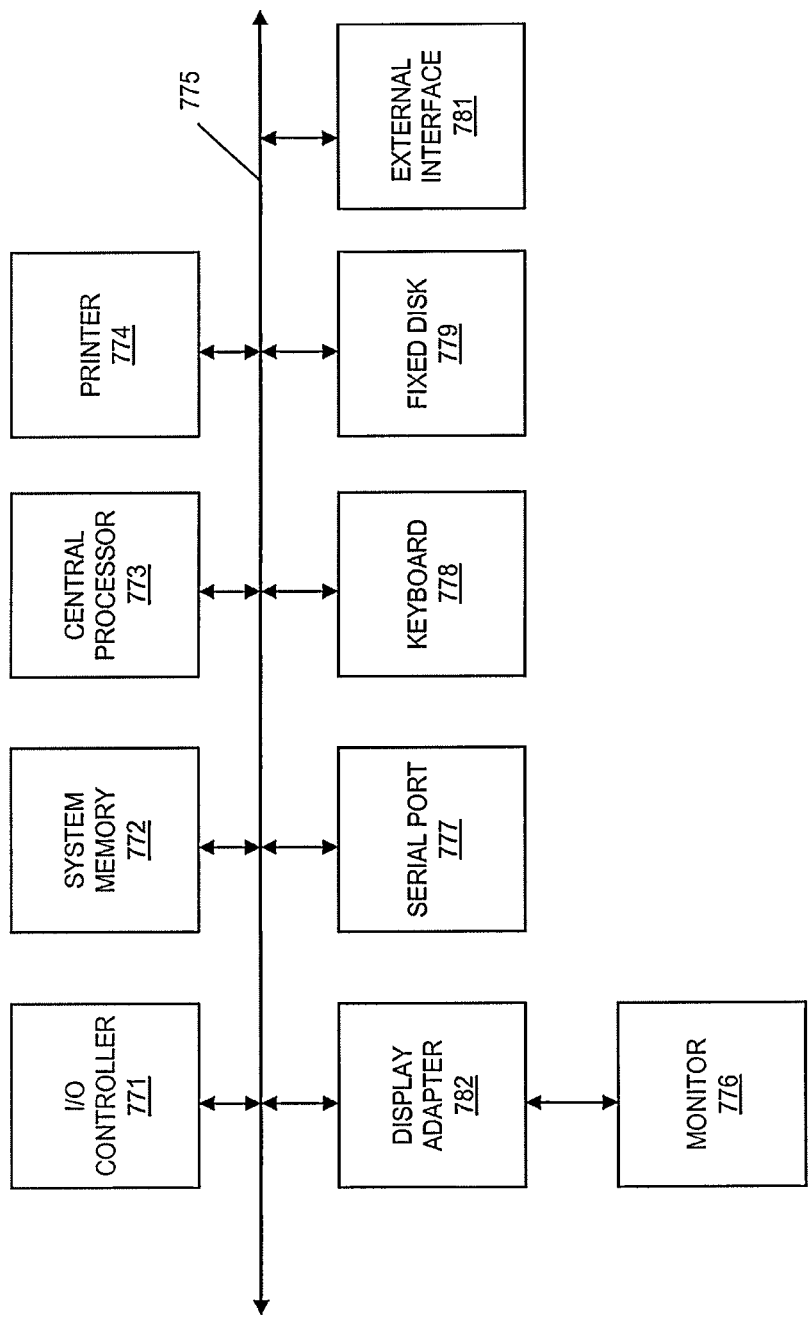
FIG. 13 shows a block diagram of a computer system that can be used according to various embodiments.

FIG. 13 shows typical components or subsystems of a computer apparatus. Such components or any subset of such components (e.g., the directory server, the risk scoring server, the TRS/Online C-R, the AHS, the ACS, computer running the merchant plug in, computer or device operated by the cardholder, or any suitable combination of the foregoing) may be present in various components shown in FIGS. 1-12. The subsystems shown in FIG. 13 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus 775 allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Additional details regarding the risk assessment process which can be used in any of the previously described embodiments are below. In the specific examples below, issuer based decision processing is discussed in detail. Although an issuer is discussed in the following specific examples, it is understood that other parties including a payment processing organization that operates a payment processing network may alternatively perform the foregoing functions.

As explained above, in some embodiments of invention an issuer or other party can receive an authentication request (PAReq) from a merchant, and it can base its authentication decision according to level of risk at the time the transaction occurs. The risk level can be determined using a risk model that assesses several characteristics, which may include, for example: an IP address, geo-location of the device, device information, transaction characteristics (e.g. amount, frequency, time of day), and previous transaction history.

The levels of risk can be defined in any suitable manner. The risk levels may alternatively be referred to as risk scores. For example, the levels of risk may be defined as the follows: "Low risk transactions" are passively authenticated; in the majority of cases, the cardholder is not cognizant of the authentication process. Cardholders may see "processing" or "purchase verifying" message displayed while the issuer is assessing the risk and determining its response. "Medium-high risk transactions" can be presented with two to three challenge questions before completing the sale. The challenge questions can be based on in-wallet and out-of-wallet data and will be validated by the issuer in real time. For "very high risk transactions," the issuer will not present a challenge question and will return an authentication failed response to the cardholder and merchant. In all the scenarios described above an authentication response can be sent to the merchant (e.g., pass, fail, passive authentication, attempt or unavailable).

In embodiments of the invention, the issuer authenticates the cardholder using a risk assessment tool (e.g., the TRS/Online C-R described above) and sends the appropriate response back to the merchant (e.g. pass, fail, passive authentication, attempt or unavailable). Based on the risk score generated by the risk tool, the risk assessment tool can respond in different ways. For some risk scores, there can be no response. For other risk scores, a challenge request can be sent or a failed transaction response can be sent. In other embodiments, the number of challenge requests may vary depending upon the risk score. As illustrated below, in some embodiments, the risk assessment tool can provide no challenge request if the risk score is low, and can provide a failed transaction message if the risk score is high. If the risk score is in a medium range, the risk score can determine the number of challenge requests that are provided to the user. For example, if the medium risk range is 3-7 on a scale of 1-10 (10 being risky and 1 being safe), a risk score of 4 may indicate that 1 challenge request is to be provided to the cardholder, while a risk score of 6 may indicated that three challenges are to be provided to the cardholder.

Figure 15:

Illustratively, if the issuer determines that the transaction is "low risk," then the cardholder will see "processing" or "purchase verifying" and will be automatically directed to the merchant's final check-out page. The issuer can then send an attempted authentication status (i.e. ECI 6) or a passive authentication status to the merchant. If the issuer determines that the transaction falls within the range of "medium-high risk," the cardholder can be presented with two to three challenge questions (or more) and may be required to authenticate before completing the sale. See, for example, FIG. 14. The cardholder enters the information requested by the issuer and clicks "Submit." The issuer then determines whether the information provided is correct. If the cardholder provides invalid authentication data and exceeds the issuer-defined entry attempts, the cardholder will be presented with the "Transaction Suspended" screen. See FIG. 15.

If the issuer determines that the transaction is "very high risk," the cardholder will be presented with information notifying them that the transaction failed.

The Access Control Server (ACS) returns the digitally-signed Payer Authentication Response to the merchant plug in via the cardholder's device.

The ACS formats a Payer Authentication Response with appropriate values, including authentication status, Electronic Commerce Indicator (ECI) and Cardholder Authentication Verification Value (CAW). More information on the ECI is provided below, in Table 1.

Whether or not authentication was successful, the ACS sends a copy of the Payer Authentication Response, plus related data, to the Authentication History Server. The server serves as the database of record for dispute resolution. Based on the data received from the MPI, the merchant determines whether to proceed with authorization.

If the Payer Authentication Response indicates that authentication failed then the merchant is required, or may be required, to ask for another form of payment from the cardholder. If authorization is appropriate, the merchant follows its standard procedure to authorize the transaction.

In some embodiments, the issuer provides an authentication status response to the merchant for every authentication request. Table 1 below lists the possible outcomes of payment authentication and the codes used to communicate the issuer's authentication decision. The values listed are those inserted in the "Transaction Status" field and the Electronic Commerce (ECI) field of the PARes message that is returned to the merchant.

TABLE 1

Issuer Authentication Results Values

| Authentication Result Determine by Issuer ACS | Transaction Status Values | ECI Value |
|---|---|---|
| Authentication Successful: The cardholder's authentication information was successfully validated. | Y | 5 |
| Authentication Failed - Invalid Authentication Data: The cardholder's authentication information failed validation or issuer determined the transaction was very high risk. | N | N/A or 7 |
| Authentication Failed - Very High Risk: Issuer or third party determined during its risk assessment that the transaction was not initiated by the cardholder | F | N/A |
| Authentication Attempt: Issuer determined that the transaction was low risk and did not prompt the cardholder to authenticate or the issuer was not available and stand-in processing is provided | A | 6 |
| Passive Authentication - Issuer or Third Party determined that enough information was provided in the authentication transaction record to determine cardholder identity | P | 6 |
| Authentication Could Not Be Performed: This is a neutral response status indicating that the issuer was not able to perform cardholder authentication. | U | 7 |

Embodiments of the invention may also include an authentication challenge screen to address the situation where the number of entry attempts is exceeded. Issuers can determine the number of attempts permitted for the cardholder to provide the correct authentication data before terminating the authentication session (e.g., three to five incorrect data entry attempts). When the issuer-defined number of attempts has been exceeded, the issuer ACS can return a "failed authentication" transaction status in the PARes. The Issuer ACS can send a message in response to failed attempts.

Embodiments of the invention may also include an authentication challenge screen when incorrect authentication data is provided. The cardholder is given an issuer-determined number of attempts to enter the authentication data correctly. If the authentication data is entered incorrectly, the cardholder will be prompted to check and re-enter the correct information As noted above, various cardholder authentication tokens may be used in embodiments of the invention. One aspect to cardholder authentication is the accurate verification of the cardholder's identity as the account holder. The appropriate application of cardholder authentication can increase security while balancing cardholder's need for convenience and speed. Issuers can carefully consider the data elements to verify the cardholder. These elements must include both in-wallet and out-of-wallet data elements. Issuers generally do not ask cardholders to provide more than three data elements during the authentication process. Table 2 below provides a variety of examples to assist issuers in developing cardholder authentication methods.

TABLE 2

Cardholder Authentication Tokens

| Data Categories | Examples of Authentication Tokens |
| --- | --- |
| Card Information (in-wallet) | Expiration Date |
| | CVV2 (Card Verification Value) |
| Cardholder Information (out-of-wallet) | Name on Card |
| | Last four digits of Social Security Number or National Identification |
| | Date of birth |
| | Telephone number (mobile or home) |
| | Address |
| | Previous address |
| | Relative names |
| | Relative address, city, or state |
| | Monthly loan payments |
| | Place of birth |
| | Zip Code (US only) |
| | Mother's maiden name |
| I. Alternative Method | One time passwords |

Table 2 described above provides some examples of cardholder authentication tokens that are static or semi-dynamic. As discussed above, cardholder authentication challenge questions can also be based on a cardholders transaction history, which will generally be more dynamic than those tokens presented in Table 2. Table 3 lists some exemplary cardholder authentication tokens that are more dynamic based on transaction history, and further may be based on complex questions determined by that transaction history.

TABLE 3

Complex Question Categories

| Group Categories | Question Group | Example |
| --- | --- | --- |
| Event | Repetitive | Which company provides your mobile service? |
| | Recurring | |
| | Seasonal | |
| | Unusual | At what car dealership did you make a large purchase at in February? |
| | AMT | |
| | Location (geographic) | |
| | Merchant | |
| | Date/Time | |
| | Exception | At what department store did you have a return for $110.93? |
| | Chargeback | |
| | Returns | |
| Fact | Fact | About how many transaction per month for this card? |
| | Trivial | What month was a purchase conducted? |
| Inference | Preference | Do you prefer McDonald's or Burger King? |
| | | Cubs or White Sox? |
| | Life Event | To what university do you pay tuition? |
| | | From what city did you move last fall? |

The exemplary group categories describe groups that contain exemplary challenge questions. For example, the Event category may describe several question groups that are based on transactions conducted by the cardholder. Repetitive transactions or those occurring seasonally may allow a challenge question to be generated based on the particular merchant involved in those transactions. Additionally, unusual transactions, such as a large purchase made at a car dealership, could be used as a challenge question.

Determining if a transaction is unusual could be based on the transaction type, such as AMT (automated money transfer), the location of the transaction, the merchant, or the date/time of the transaction. Once a transaction is determined to be unusual, it may be used in a challenge question. Additionally, questions may be based on unusual events. For example, returns or disputes that result in a chargeback.

Challenge questions can also be based on facts related to the transactions conducted with the card. For example, the number of transactions per month typically conducted with the account. Such information is obtainable by analyzing the transaction history of the account. Furthermore, simple trivial challenge questions, such as in what month was a purchase conducted, may be used.

Additionally, transaction data may be used to create challenge questions that are based on inferences gained from analyzing transaction details. Inferences can be made with respect to a cardholder's preferences based on transaction history. For example, large numbers of transactions at a particular fast food restaurant or purchases related to a particular sports team may indicate a cardholders preference for that restaurant or sports team.

Additionally, inferences could be made about certain life events associated with the cardholder. For example, if the city in which the majority of transactions occurs changes from one month to another, and inference may be made that the cardholder moved. In addition, if transactions to an education institution are made, an inference could be made that the transactions are related to tuition.

Although several examples of complex question types based on transaction history have been presented in Table 3, this is merely exemplary and is not limiting. Any number of additional categories, groups, and questions have also been contemplated.

Figure 16:

FIG. 16 depicts an exemplary screen shot of a complex question based on a transaction history that may be presented to a cardholder. The cardholder may be requested to select one or more transactions that he recognizes. This is a very simple challenge to implement, as it only requires the selection of any number of transactions from the transaction history and any number of transactions that are not in the transaction history. The cardholder is also given the option to respond that none of the transactions are recognized. By not letting the recipient of the challenge question know how many correct response, or even if there are any correct responses, in such a question reduces the possibility that a random guess would result in a correct answer. In the event that the user does not answer the challenge question correctly, a new set of transactions can be chosen to present in a subsequent question, such that no information about the transaction history could be gained by repeated guessing.

Figure 17:
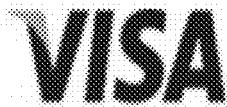

FIG. 17 depicts an exemplary screen shot of a different complex question based on a transaction history that may be presented to a cardholder. The cardholder may be asked which cities he visited in the past ninety days. Just as above, the answer to the question could be determined by reviewing the transaction history of the user. Again, the questions are presented such that a random guess will have a low likelihood of properly selecting the correct response or responses.

Challenge questions based on transaction data may be selected so that they are easily answered by a cardholder. The questions are typically simple and based on easily recallable and/or memorable transactions. Furthermore, the questions selected should be difficult for a fraudulent user to answer with any greater success than with a random guess.

Furthermore, repeated attempts at answering the challenge question should not leak any cardholder transaction information.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

In general, the steps associated with the various methods of the present invention may be widely varied. For instance, steps may be added, removed, reordered, and altered. The present examples are to be considered as illustrative and not restrictive, and the invention is not to be limited to the details given herein, but may be modified within the scope of the appended claims.

A recitation of "a", "an" or "the" is intended to mean "one or more" unless specifically indicated to the contrary.

One or more features from any embodiment may be combined with one or more features of any other embodiment without departing from the scope of the disclosure.

What is claimed is:

1. A method of authenticating a consumer conducting a transaction with a merchant, the method comprising:
    sending, by a client computer, a transaction request to a merchant computer, the transaction request including information associated with an account being used to conduct the transaction, wherein the merchant computer is configured to send a request message to a server computer, wherein the server computer is configured to determine that an authentication challenge will be sent to the client computer based upon a risk determination that a risk threshold has been exceeded and is configured to determine that the authentication challenge will not be sent if the risk threshold is not exceeded;
    receiving, by the client computer from the merchant computer, a uniform resource locator associated with the server computer to be utilized for a consumer authentication;
    gathering and sending characteristics of the client computer to the server computer, wherein the risk determination is based upon characteristics of the transaction and the characteristics of the client computer;
    sending, by the client computer using the uniform resource locator, a request to the server computer for the consumer authentication;
    receiving, by the client computer, the authentication challenge from the server computer after the server computer determines that the risk threshold has been exceeded, wherein the authentication challenge is received using the uniform resource locator, and wherein the authentication challenge is dynamically generated by the server computer based on transaction history associated with the account;
    sending, by the client computer, a challenge response to the server computer, wherein the server computer compares the challenge response to an expected response;
    receiving, by the client computer from the server computer, a result of the consumer authentication; and
    sending, by the client computer, the result of the consumer authentication to the merchant computer, wherein the merchant computer thereafter initiates authorization processing.

2. The method of claim 1, wherein the risk determination is a risk score.

3. The method of claim 1 wherein the result of the consumer authentication is sent in a payer authentication response.

4. The method of claim 1, wherein the merchant computer is configured to send the request message to the server computer via a directory server.

5. The method of claim 1, wherein the transaction is a credit card transaction.

6. The method of claim 1, further comprising:
    sending information regarding the result of the consumer authentication to an authentication history server.

7. The method of claim 1, wherein the authentication challenge comprises a password challenge.

8. The method of claim 1, wherein authorization processing occurs through an acquirer.

9. A client computer comprising a processor and the computer readable medium coupled to the processor, the computer readable medium comprising code executable by the processor to implement a method comprising:
    sending, by the client computer, a transaction request to a merchant computer, the transaction request including information associated with an account being used to conduct the transaction, wherein the merchant computer is configured to send a request message to a server computer, wherein the server computer is configured to determine that an authentication challenge will be sent to the client computer based upon a risk determination that a risk threshold has been exceeded and is configured to determine that the authentication challenge will not be sent if the risk threshold is not exceeded;
    receiving, by the client computer from the merchant computer, a uniform resource locator associated with the server computer to be utilized for a consumer authentication;
    gathering and sending characteristics of the client computer to the server computer, wherein the risk determination is based upon characteristics of the transaction and the characteristics of the client computer;

sending, by the client computer using the uniform resource locator, a request to the server computer for the consumer authentication;

receiving, by the client computer, the authentication challenge from the server computer after the server computer determines that the risk threshold has been exceeded, wherein the authentication challenge is received using the uniform resource locator, and wherein the authentication challenge is dynamically generated by the server computer based on transaction history associated with the account;

sending, by the client computer, a challenge response to the server computer, wherein the server computer compares the challenge response to an expected response;

receiving, by the client computer from the server computer, a result of the consumer authentication; and sending, by the client computer, the result of the consumer authentication to the merchant computer, wherein the merchant computer thereafter initiates authorization processing.

10. The client computer of claim 9, wherein the risk determination is a risk score.

11. The client computer of claim 9, wherein the result of the consumer authentication is sent in a payer authentication response.

12. The client computer of claim 9, wherein the merchant computer is configured to send the request message to the server computer via a directory server.

13. The client computer of claim 9, wherein the transaction is a credit card transaction.

14. The client computer of claim 9, wherein the method further comprises:

sending information regarding the result of the consumer authentication to an authentication history server.

15. The client computer of claim 9, wherein the authentication challenge comprises a password challenge.

16. The client computer of claim 9, wherein authorization processing occurs through an acquirer.

17. A system comprising:

the client computer of claim 9; and the server computer coupled to the client computer.

18. The system of claim 17, further comprising the merchant computer coupled to the client computer.

19. The method of claim 1, wherein the request that is sent from the client computer to the server computer for the consumer authentication includes at least one of an IP address associated with the client computer, a browser version associated with a browser in the client computer, and a browser language associated with the browser.

20. The method of claim 1, wherein the request that is sent from the client computer to the server computer for the consumer authentication includes the characteristics of the client computer, and wherein the characteristics of the client computer include an IP address associated with the client computer, a browser version associated with a browser in the client computer, and a browser language associated with the browser.

21. The method of claim 1, wherein sending the characteristics of the client computer to the server computer and sending the request to the server computer for the consumer authentication occur in a single message transmission.

* * * * *